(12) United States Patent
Sullenberger et al.

(10) Patent No.: US 9,444,735 B2
(45) Date of Patent: Sep. 13, 2016

(54) CONTEXTUAL SUMMARIZATION TAG AND TYPE MATCH USING NETWORK SUBNETTING

(71) Applicant: Cisco Technology, Inc., San Jose, CA (US)

(72) Inventors: Michael L. Sullenberger, San Jose, CA (US); Andre Karamanian, Durham, NC (US)

(73) Assignee: Cisco Technology, Inc., San Jose, CA (US)

( * ) Notice: Subject to any disclaimer, the term of this patent is extended or adjusted under 35 U.S.C. 154(b) by 263 days.

(21) Appl. No.: 14/192,104

(22) Filed: Feb. 27, 2014

(65) Prior Publication Data

US 2015/0244613 A1 Aug. 27, 2015

(51) Int. Cl.

| | | |
|---|---|---|
| H04L 12/28 | (2006.01) | |
| H04L 12/56 | (2006.01) | |
| H04L 12/741 | (2013.01) | |
| H04L 12/24 | (2006.01) | |

(52) U.S. Cl.
CPC ........... *H04L 45/74* (2013.01); *H04L 41/5012* (2013.01); *H04L 41/5058* (2013.01)

(58) Field of Classification Search
CPC H04L 45/74; H04L 41/5012; H04L 41/5058
See application file for complete search history.

(56) References Cited

U.S. PATENT DOCUMENTS

| | | |
|---|---|---|
| 6,259,705 B1 | 7/2001 | Takahashi et al. |
| 6,393,415 B1 | 5/2002 | Getchius et al. |
| 6,484,251 B1 * | 11/2002 | McDonald ............ G06F 9/3836 708/495 |
| 7,200,589 B1 | 4/2007 | Graupner |
| 7,457,835 B2 | 11/2008 | Toebes et al. |
| 7,543,020 B2 | 6/2009 | Walker et al. |
| 7,599,852 B2 | 10/2009 | Bosarge et al. |
| 7,634,566 B2 | 12/2009 | Turner et al. |
| 7,747,720 B2 | 6/2010 | Toebes et al. |
| 7,752,074 B2 | 7/2010 | Bosarge et al. |
| 7,752,311 B2 | 7/2010 | Walker et al. |
| 7,769,767 B2 | 8/2010 | Petersen |
| 7,870,420 B2 | 1/2011 | Lloyd et al. |

(Continued)

FOREIGN PATENT DOCUMENTS

WO 2004110023 A1 12/2004

OTHER PUBLICATIONS

Java Message Service API Tutorial, by Kim Haase (2002), Sun Microsystems, Inc. (278 pages).

(Continued)

*Primary Examiner* — Lonnie Sweet
(74) *Attorney, Agent, or Firm* — Edell, Shapiro & Finnan, LLC

(57) ABSTRACT

Techniques are presented herein to distribute the processing of communication to network-connected devices to routing nodes, as opposed to centralizing those operations in one device as in the traditional/classical system. Using a bit-mapped Type field, advertisements and queries can be categorized. Also, by using a Subgroup field, the scope of advertisements and queries can be dynamically limited. These techniques reduce the number of matches and make the matches more relevant to the user who sent the query. Routing nodes can be any network element that routes traffic, physical or virtual (cloud-based router or switch). The intelligence to perform these techniques can be embodied as an overlay on top of a physical network.

27 Claims, 19 Drawing Sheets

(56) References Cited

U.S. PATENT DOCUMENTS

| | | | |
|---|---|---|---|
| 7,974,874 B2 | 7/2011 | Bosarge et al. | |
| 8,195,714 B2 | 6/2012 | McKibben et al. | |
| 8,255,529 B2 | 8/2012 | Ferris et al. | |
| 8,271,653 B2 | 9/2012 | DeHaan | |
| 8,380,721 B2 | 2/2013 | Attaran Rezaei et al. | |
| 8,489,599 B2 | 7/2013 | Bellotti | |
| 2005/0022202 A1 | 1/2005 | Sannapa Reddy et al. | |
| 2005/0033843 A1 | 2/2005 | Shahi et al. | |
| 2005/0215265 A1 | 9/2005 | Sharma et al. | |
| 2005/0223026 A1 | 10/2005 | Chaudhuri et al. | |
| 2005/0269417 A1* | 12/2005 | Wood | H04N 1/32149 235/494 |
| 2005/0283645 A1 | 12/2005 | Turner et al. | |
| 2006/0179106 A1 | 8/2006 | Turner et al. | |
| 2006/0212532 A1 | 9/2006 | Burckart et al. | |
| 2006/0242300 A1 | 10/2006 | Yumoto et al. | |
| 2007/0121490 A1 | 5/2007 | Iwakawa et al. | |
| 2008/0086567 A1 | 4/2008 | Langen et al. | |
| 2008/0238919 A1 | 10/2008 | Pack | |
| 2008/0256549 A1 | 10/2008 | Liu et al. | |
| 2009/0245113 A1 | 10/2009 | Kamiya | |
| 2009/0287825 A1 | 11/2009 | Walker et al. | |
| 2010/0002694 A1* | 1/2010 | Matsukawa | H04W 24/00 370/389 |
| 2010/0223378 A1 | 9/2010 | Wei | |
| 2010/0223382 A1 | 9/2010 | Rayes et al. | |
| 2010/0228819 A1 | 9/2010 | Wei | |
| 2010/0250668 A1 | 9/2010 | Toebes et al. | |
| 2010/0251329 A1 | 9/2010 | Wei | |
| 2010/0287280 A1 | 11/2010 | Sivan | |
| 2010/0332588 A1 | 12/2010 | Schwimer | |
| 2010/0333116 A1 | 12/2010 | Prahlad et al. | |
| 2011/0022642 A1 | 1/2011 | deMilo et al. | |
| 2011/0066728 A1 | 3/2011 | Gauthier et al. | |
| 2011/0126197 A1 | 5/2011 | Larsen et al. | |
| 2011/0137805 A1 | 6/2011 | Brookbanks et al. | |
| 2011/0138050 A1 | 6/2011 | Dawson et al. | |
| 2011/0145439 A1 | 6/2011 | Chaturvedi et al. | |
| 2011/0173324 A1 | 7/2011 | Wang et al. | |
| 2011/0179132 A1 | 7/2011 | Mayo et al. | |
| 2011/0179162 A1 | 7/2011 | Mayo et al. | |
| 2011/0289162 A1 | 11/2011 | Furlong et al. | |
| 2011/0295998 A1 | 12/2011 | Ferris et al. | |
| 2011/0320605 A1 | 12/2011 | Kramer et al. | |
| 2012/0030343 A1 | 2/2012 | Ryder | |
| 2012/0030751 A1* | 2/2012 | Datta | H04L 63/0428 726/15 |
| 2012/0054332 A1 | 3/2012 | Sahu et al. | |
| 2012/0054345 A1 | 3/2012 | Sahu et al. | |
| 2012/0054626 A1 | 3/2012 | Odenheimer | |
| 2012/0060165 A1 | 3/2012 | Clarke | |
| 2012/0179802 A1 | 7/2012 | Narasimhan et al. | |
| 2012/0224486 A1 | 9/2012 | Battestilli et al. | |
| 2012/0226789 A1 | 9/2012 | Ganesan et al. | |
| 2012/0226790 A1* | 9/2012 | Singh | G06F 9/5072 709/223 |
| 2012/0226797 A1 | 9/2012 | Ghosh et al. | |
| 2012/0226799 A1 | 9/2012 | Kapur et al. | |
| 2012/0311144 A1 | 12/2012 | Akelbein et al. | |
| 2013/0044741 A1 | 2/2013 | Lappetelainen et al. | |
| 2013/0080517 A1 | 3/2013 | T'Syen et al. | |

OTHER PUBLICATIONS

XMPP XEP-0051: Connection Transfer, Klaus Wolf et al., (1999), XMPP Standards Foundation, (5 pages).

Rich Miller, "Can Amazon be a Player in Disaster Recovery?," Data Center Knowledge, Mar. 12, 2009, pp. 1-8.

Rich Miller, "How Google Routes Around Outages," Data Center Knowledge, Mar. 25, 2009, pp. 1-12.

Hoang Nguyen et al., "Detecting Anomalies by Data Aggregation in the Power Grid", University of Illinois, Computer Science Research and Tech Reports, Jul. 2006, 10 pages.

Wikipedia, "Distributed hash table", http://en.wikipedia.org/w/index.php?title=Distributed_hash_table&printa . . . , retrieved Dec. 23, 2013, 7 pages.

Zhu et al., "Tag-Oriented Document Summarization", WWW 2009, Apr. 20-24, 2009, Madrid, Spain, pp. 1195-1196.

Kang et al. "Interactive Hierarchical Tag Clouds for Summarizing Spatiotemporal Social Contents", http://www.comp.nus.edu.sg/~atung/publication/icde2014.pdf, retrieved Dec. 23, 2013, 12 pages.

* cited by examiner

CONTEXTUAL SUMMARIZATION TAG AND TYPE MATCH USING NETWORK SUBNETTING

TECHNICAL FIELD

The present disclosure relates to networking systems.

BACKGROUND

Today, the approaches available for the distribution and summarization of network connected device capability information in a network are limited to a centralized model and rely on the use of computational power to provide matching of contextual types and tags to items of interest. As the number of advertisements grows, the number of potential matches of queries to advertisements grows. Some matches may have nothing to do with the topic of interest of the entity making the query, thereby creating a larger proportion of uninteresting responses to queries as the size of the query space grows. Also, with a centralized model, the collection of contextual types and tags has to be done prior to receiving and processing queries to search the database. Therefore, the database will always be outdated.

DESCRIPTION OF EXAMPLE EMBODIMENTS

Overview

Figure 1:
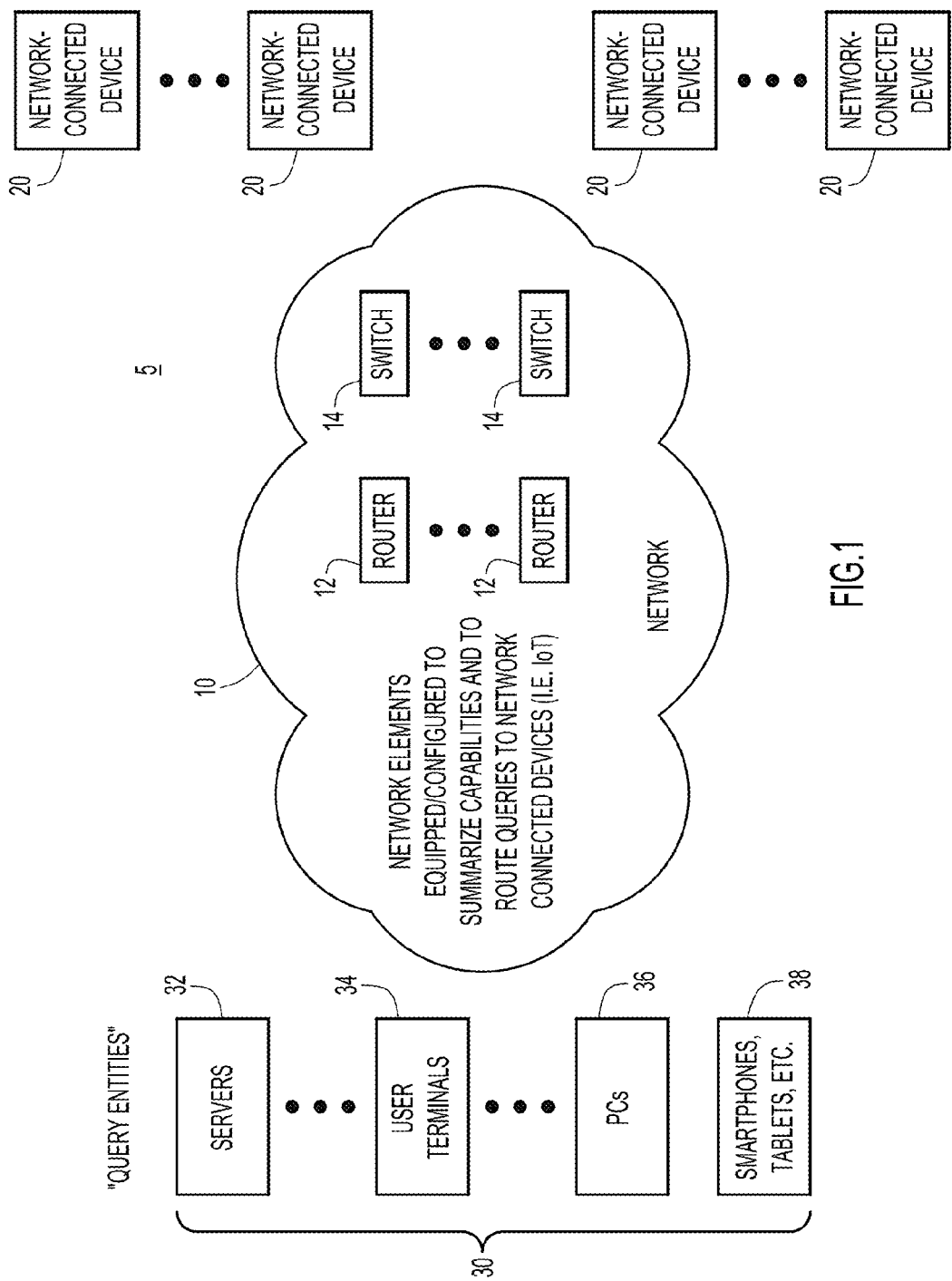
FIG. 1 is a system diagram illustrating an example environment in which the contextual summarization tag and type matching techniques described herein may be employed.

In accordance with one aspect, a first network element is configured to perform routing or switching operations in a network. The first network element obtains Type field and Subgroup field information for each of a plurality of network-connected devices to which the first network element is connected. The Type field is a bit map representation of capabilities of the network-connected device and the Subgroup field is a binary expression of a number representing a subgroup to which the network-connected device is a member. A tag is appended to each of a plurality of routing entries maintained by the first network element. The tag comprises a Type field and a Subgroup field for each network-connected device so that each routing entry includes an identifier for the network-connected device, together with the Type field and Subgroup field for the network-connected device. The first network element generates summarized information of a plurality of routing entries maintained by the first network element, the summarized information consolidating the Type field and Subgroup field information for the plurality of routing entries. The first network element advertises capabilities of the network-connected devices connected to the first network element by sending to one or more other network elements a message comprising summarized routing entries and associated summarized Type field and Subgroup field information.

In accordance with another aspect, the first network element receives from a plurality of other network elements messages advertising capabilities of network-connected devices in the network, each message comprising one or more routing entries each including a network identifier and a tag including a Type field and a Subgroup field. The Type field is a bit map representation of capabilities of one or more network-connected devices associated with the network identifier and the Subgroup field is a binary expression of a number representing a subgroup to which each of the one or more network-connected devices is a member. The first network element generates summarized information from the routing entries contained in the received messages, the summarized information consolidating on the basis of network identifiers, the Type field and Subgroup field information for the routing entries. The first network element advertises the capabilities of the network-connected devices associated with the plurality of other network elements by sending to at least a second network element, a message comprising each network identifier and its associated summarized Type field and Subgroup field information.

In accordance with yet another aspect, the first network element receives a message including a query intended for one or more network-connected devices, the query containing at least a Type field comprising a bit map representation of one or more capabilities of network-connected devices and/or a Subgroup field comprising a binary expression of a number representing a subgroup to which one or more network-connected devices is a member. The first network device analyzes the query with respect to stored data comprising one or more routing entries, each routing entry including an identifier, a Type field representing one or more capabilities of network-connected devices and/or a Subgroup field representing a subgroup to which one or more network-connected devices is a member, in order to identify one or more routing entries, if any, in the stored data that match the query. The query is forwarded to either one or more network-connected devices associated with the first network element for one or more routing entries determined to match the query and/or to one or more other network elements associated with the one or more identifiers for the one or more routing entries determined to match the query.

Example Embodiments

Traditionally in a packet switched network, forwarding of packets or queries is done based on destination address and subnets. This can be done efficiently and the size of the routing tables can be kept smaller by summarizing destination subnets and only advertising the summary to the rest of the network. If another factor, like a type or tag, is to be added to the packet forwarding decision process, then another routing table is created, one for each tag or type value. Each routing table is then populated with routes with the same tag value. If a route has multiple tag values set, then a copy of the route needs to appear in each tag value routing table, which uses more memory and is less efficient. As networks look to forwarding by other parameters, like location, this problem gets worse, since the use of tags and types will be used to refine the match space.

Users of networks often want to subdivide the network into overlay networks layered on top of the actual physical network. Currently, this requires changes in the network to add each overlay. Users cannot define and add overlays dynamically. It would be useful to have a system built into the network where network-connected devices (advertisers) and users (query entities) could dynamically limit their traffic to such an overlay without having to setup or make network changes.

To summarize, there are four issues with current capabilities summarization schemes:

1. Contextual type/tag matching scalability relies heavily on computational power and memory of a centralized server.
2. Information types and tagging are not built with network intelligence as a core tenant.
3. Defining and using overlays to limit the scope of query/packet forwarding requires changes to the network.
4. As the query space grows, the number of uninteresting responses to queries grows.

Currently, contextual tagging uses brute computing power to perform matching analysis. By moving this functionality to the network layer, a router or other network device can perform the same task, providing search like functionality to small and medium enterprises in a distributed manner. This provides additional intelligence to the network that can be combined with other pieces of data providing a new dimension to network intelligence.

Reference is first made to FIG. 1. FIG. 1 illustrates a system 5 including a network 10, a plurality of network-connected devices 20, and one or more query entities 30. The network 10 may be a combination of local area networks and wide area networks (e.g., the Internet). As shown in FIG. 1, the network 10 includes a plurality of network elements, such as routers 12 and switches 14. Other network elements may exist in network 10 as is known in the art, but for simplicity are not shown in FIG. 1. Moreover, the functions of one or more of the network elements of network 10 may be performed virtually by software (virtual machines) running in a data center.

The network-connected devices 20 may be any of a variety of devices with (wired or wireless) network connectivity, such as servers or any content-providing entity or process, including, Internet of Things (IoT) devices, such as sensors (temperature, pressure, speed, etc.), radio frequency identifier (RFID) tags, alert devices, monitoring devices, etc. The types of IoT devices are too numerous to list. However, various network-connected devices will have different capabilities with respect to the type of information that they can provide to a querying entity ("user device"). Moreover, network-connected devices, such as IoT devices, may be manufactured by any of a variety of numerous manufacturers. It would be useful to be able to easily query network-connected devices based on the capabilities type as well as subgroup to which those devices are relevant, where the subgroup may be manufacturer/vendor, date (or date range) of deployment, date (or date range) of manufacture, etc. The term "network-connected device" is meant to include any device with network connectivity that has content or information useful to another device or process.

The query entities 30 are devices or processes (e.g., running on devices or in a data center) that may send a query intended for one or more network-connected devices 20. That is, the query may be a request for data from a particular network-connected device, or from a collection of Network-connected devices that satisfy certain query criteria. Examples of query entities include servers 32 (or processes running on servers), user terminals 34 (any device/process with network connectivity), personal computers (PCs) 36 and other devices such as SmartPhones, tablet computers, etc.

According to the embodiments presented herein, the network elements in the network 10, e.g., the routers 12 and/or switches 14, are equipped/configured to receive capabilities advertisements associated with network-connected devices 20 from network-connected devices or from intervening network elements, and to summarize network-connected device capabilities and pass on such capabilities summarization information to other network elements. In addition, the network elements in network 10 are configured to route queries received from the query entities 30 to other network elements, as appropriate, and ultimately to the appropriate network-connected devices.

More specifically, the network-connected devices 20 advertise their capabilities into the network 10. The network elements in the network 10 propagate the network-connected device capability information throughout using summarization techniques. When a query entity sends a query to one or more network-connected devices that have a particular capability, the network elements in network 10 forward (and replicate as appropriate) that query through the network 10 so that every network-connected device that has the capability or that satisfies that query gets a copy of the query. Any network-connected device that has the capability responds to the query. The network elements in the network 10 are configured to handle queries received from query entities 30. In other words, the query flows as "multicast" outbound in terms of the request, and "unicast" back from the network-connected device to the query entity.

When network elements receive advertisements from network-connected devices, the network elements generate and associate a tag with each advertisement. Thereafter, when the network element receives a query, it only forwards to other network elements (or if the network device is a leaf node to the network-connected device itself) queries for which it has a matching tag. As a result, there are fewer extraneous matches.

There are two categories of tags: Type and Subgroup. That is, a tag includes a field for Type and a field for Subgroup.

The Type field is a bit mapped field of well known types. For example, the Type field is a 4 byte (eight bits per byte) bit mapped field for 32 possible types of capabilities that a network-connected device may have. As an example, the capabilities types may include video, text, photo, travel, geography, lodging, historical, business, retail, places of interest, etc. Such capabilities may be represented as "(vtpt, glhb, rp . . . )." A bit is set in the Type field to indicate if that network-connected device has that corresponding capability. If the bit is not set, then it does not have that capability. Examples of Type fields are described below.

The Subgroup field is a binary representation of a number that is associated with one of a plurality of Subgroups. The integer value of the bits in the Subgroup field determines a Subgroup. As an example, the Subgroup field is a 4 byte integer (for a total of 32 bits, resulting in 4 billion possible Subgroups). As explained above, the Subgroup field is useful to distinguish different types of network-connected devices or groups of network-connected devices, such as network-connected device manufacturer. For example, a query may be sent for a capability Type (e.g., water pressure) but it is desired to receive responses from network-connected devices from a particular manufacturer. Thus, such a query would include an appropriate value for that particular manufacturer in the Subgroup field bit value. More generally, the Subgroup field could be used to group network-connected devices together based on any grouping criteria, such as owner, geographic location (city, state, country), or any ad-hoc grouping criteria; manufacturer is only one example.

As explained further hereinafter, the Subgroup field could be used to interpret the Type field in a different way. In other words, different manufactures (different Subgroups) could interpret the Type field bits in different ways. Such an interpretation is transparent to the network, since the network can summarize/match the Type and Subgroup bits without having to know their meaning Only the sender of the query and the network-connected device answering the query would have to know the meaning of the Type field bits.

Network elements associate tags (including a Type field and a Subgroup field) with routing entries that they maintain in their routing tables. In this sense, the tags serve as an overlay on the routing entries. The network elements summarize the tag information in a similar manner that it summarizes the route information. The network elements efficiently propagate tag information through the network in much the same way as they propagate routing information through the network, possibly with the same routing protocols that are already used. Some modification would be needed for the routing protocol to carry (but not interpret the Subgroup and Type fields.

Thus, these techniques greatly reduce the amount of information that needs to be propagated through the network by summarizing the capabilities information through the network and having the information propagated through the network. This summarized capabilities information (contained in the tags) is "piggybacked" on the routing information that network elements maintain.

When a network element receives advertisements (tags) from network-connected devices or from other network elements, it associates the tags with corresponding route-entries. When the network element advertises these route entries to other network elements, then it can summarize the route entry and the associated tag (Type and Subgroup fields). Specifically, Type fields are summarized by a logical "OR" operation. Similarly, Subgroup fields are also summarized by a logical "OR" operation. Each routing entry will have a single tag, containing a single Type field and a single Subgroup field. Those tag fields may have been summarized to get to that point. Each time a network element summarizes received advertisements, information can be lost. A query could get to a router, close to a leaf/edge, and that router could find nothing that matches that query. That copy of the query would die there. In other ways, a query could reach a leaf and not have a match there. This is an expected consequence.

Once all tagging information is distributed through the network, the network elements use that information to appropriately forward queries. The network elements have matching logic used to find matching routing entries with a query, and then of those matching routing entries, the network elements find entries with matching Type fields, then of those with matching Type fields, the network elements find entries with matching Subgroup fields. It should be understood that matching could be made on Subgroup before Type, and it will not make any difference in the end result.

To find matching Type fields, a logical "AND" operation is performed between the query Type field and the routing entry type field. If the result of the AND operation is non-zero (if result≠0), this means that there is a match; otherwise there is not a match. To find matching Subgroup fields, a logical AND operation is performed. If the result of the AND operation is equal to the Subgroup contained in the query, this means there is a match; otherwise, there is not a match. Furthermore, a last hop is checked is made if the network element is the last hop to the network-connected device. If the Subgroup contained in the query is equal to the Subgroup of the network-connected device at that last hop, then a match is declared, and otherwise, there is no match. One purpose of last step in the Subgroup matching is to prevent a device from putting all 1's in its Subgroup field, and thereby attract all queries. A network-connected device can select multiple bits in the Type field for multiple Types, and send one advertisement. But for Subgroups, the network-connected device sends a separate advertisement for each Subgroup. Typically, a device is a member of just one Subgroup or just a few Subgroups. In either case, the first-hop network device can summarize the multiple advertisements (with different Subgroups) from the single network-connected device into a single advertisement sent to the rest of the network.

One use case for techniques presented herein is with the Internet of Things (IoT). As the number of nodes (sometimes called "motes" for IoT) increases the capability of finding and extracting information from these nodes becomes more difficult. These nodes will be distributed through the Internet by IP (IPv6) address and subnets. These subnets are aggregated into larger subnets (summaries) as the routing information is propagated throughout the network. Each of the nodes (motes) may have one or more specific sensing capabilities, (for example: temperature, pressure, soil pH, humidity, etc.), this can be represented by the Type field. Also the nodes may be grouped by other characteristics such as by manufacturer or owner, and this can be represented by the Subgroup field.

In order to extract information, requests would be sent to the nodes/motes to request the needed information. However, in order to find the nodes/motes that can provide the necessary information one would have to know the address of each node/mote that has the capability (Type) and possibly also the owner or manufacturer (Subgroup) to obtain readings (or other data) from the correct set of nodes/motes. An example request would be to collect temperature readings from all nodes/motes in a section of the network (IPv6 subnet) that are owned by company A. Note that an IPv6 subnet could contain thousands if not millions of nodes/motes, of which only a subset is requested to answer.

Currently, in order to set up such a request there would have to be an out-of-band database that keeps track of this information matching both Types and Subgroups to IPv6 addresses. This could be done, but it would create a central congestion and failure point in the system. Also there would be substantial cost to try to keep the database up-to-date as nodes/motes move location in the network (change IP address and subnet), change function (Type), change Subgroup, fail, are replaced or added. Also a separate request would have to be sent to each node/mote that matched the criteria in the central database.

The techniques presented herein provide a way for the nodes/motes themselves to report their Type and Subgroup characteristics to the network tied in with their IPv6 address and subnet. The node/mote type and subgroup information tied with the nodes IPv6 address will then be available and automatically distributed throughout the network. This information would automatically be updated as nodes/motes advertise and re-advertise this information into the network.

One issue with tying the Type and Subgroup information with an IPv6 address/subnet is that the IPv6 subnets are aggregated (summarized) as they are advertised/propagated throughout the network. The issue then becomes how to also aggregate (summarize) this Type and Subgroup information that is tied with the IPv6 address and subnet. The aggregation (summarization) of Type and Subgroup information tied to the IPv6 address and subnet or other aggregatable addressing/routing system are core to the techniques presented herein. While IPv6 is referred to herein, it is meant only by way of example. The techniques presented herein may be used with any aggregatable addressing/routing scheme, such as location, for example.

Figure 2:
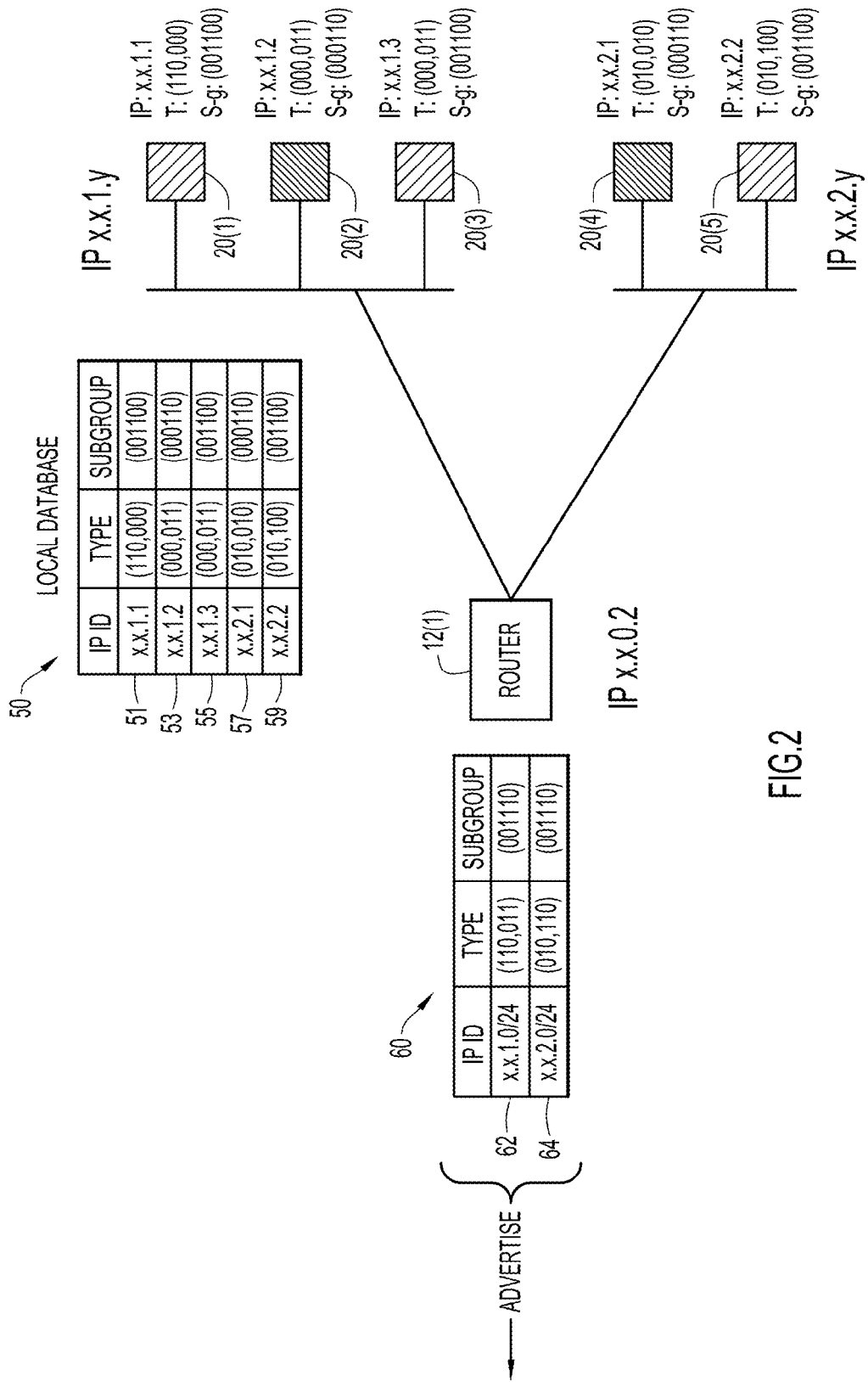
FIG. 2 is a diagram illustrating an example of the techniques for advertising and summarizing capabilities of network-connected devices.
Figure 3:
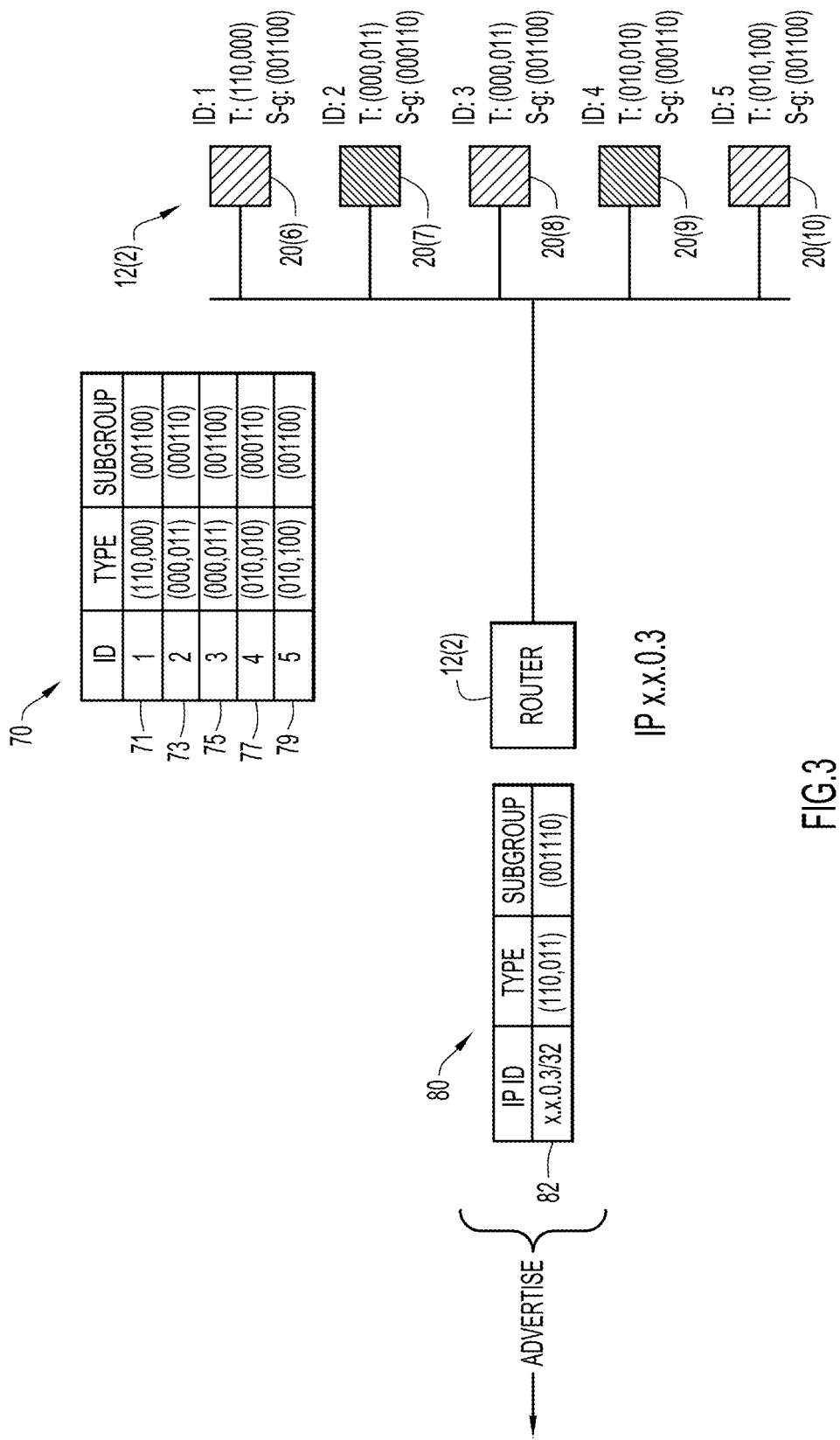
FIG. 3 is a diagram illustrating an example variation of the techniques for advertising and summarizing capabilities of network-connected devices.
Figure 4:
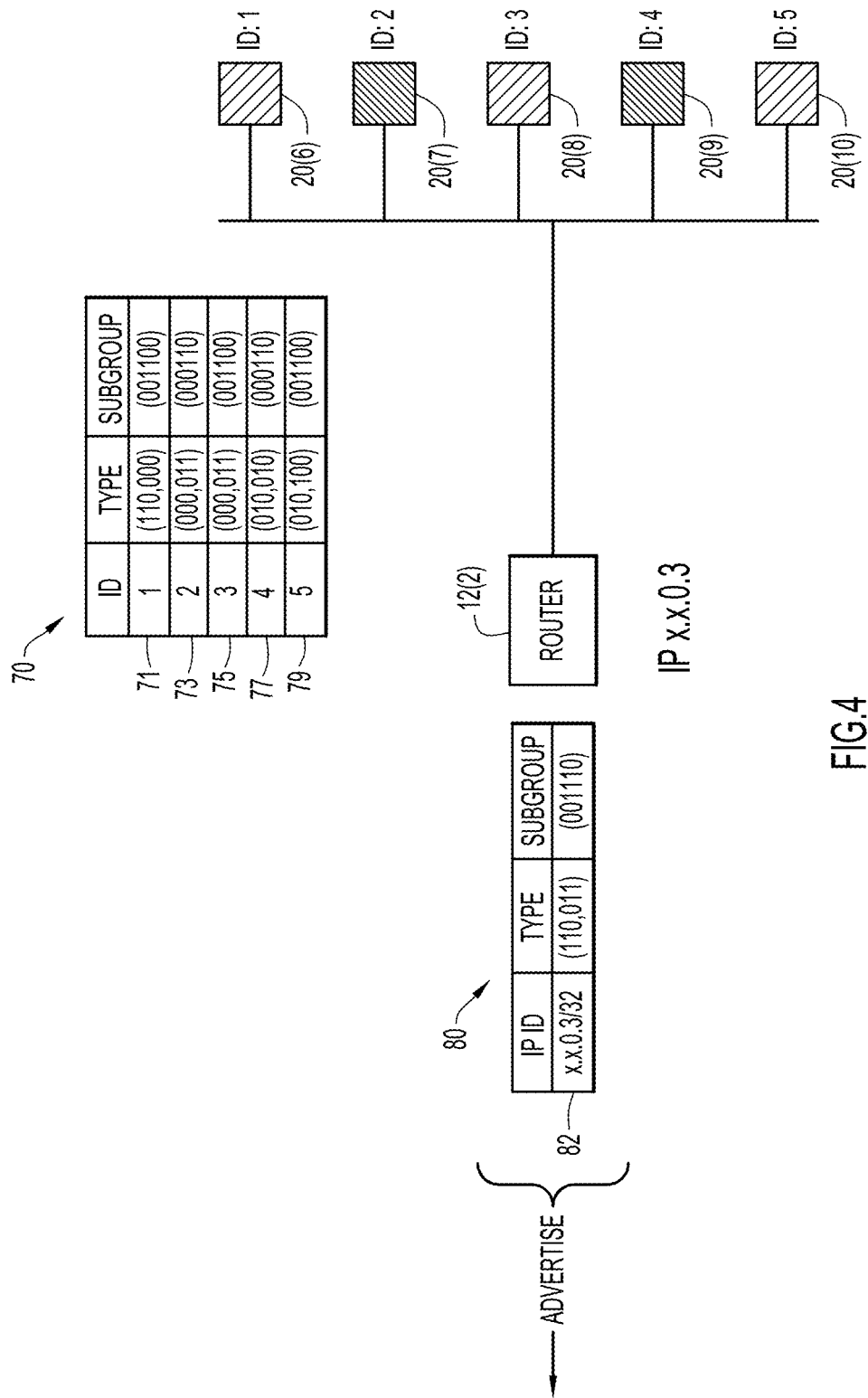
FIG. 4 is a diagram illustrating still another example variation of the techniques for advertising and summarizing capabilities of network-connected devices.

Reference is now made to FIGS. 2-4 for examples of network-connected device capabilities advertising and summarization operations of network elements, e.g., a router 12(1). In FIG. 2, five network-connected devices (also referred to as "motes" or leaf end nodes) 20(1)-20(5) are shown. Motes 20(1)-20(3) are in IP subnet x.x.1.y and motes 20(4) and 20(5) are in IP subnet x.x.2.y. Router 12(1) connects to motes 20(1)-20(5) on these two subnets. The motes in this example are from two different manufactures/vendors as shown by the cross-hatching patterns in FIGS. 2-4. Motes 20(1), 20(3) and 20(5) are from the same manufacturer or vendor, and motes 20(2) and 20(4) are from the same manufacturer or vendor. Each of the motes 20(1)-20(5) advertises its capabilities to the network element, router 12(1). The router 12(1) stores in a local database information representing the capabilities of the motes 20(1)-20(5) associated with the address of each mote. The IP address of the router 12(1) is x.x.0.2.

In this example, the Type field is 6 bits and the Subgroup field is 6 bits. Also, in this example, the Type field has three bits for air characteristics and three bits for soil characteristics, i.e., Type (Air (Temperature, Pressure, Humidity), Soil (Temperature, pH, Water-Content)). Thus, the left most 3 bits represent the air characteristics (Temperature, Pressure, Humidity) and the right most 3 bits represent the soil characteristics (Temperature, pH, Water-Content). The bit patterns representing the capabilities of each of the motes 20(1)-20(5) are shown in FIG. 2, following the "T:". The binary bit values for the two Subgroups, in this example, are "001100" and "000110". Thus, motes 20(1), 20(3) and 20(5) have 001100 in their Subgroup (denoted "S-g:" in FIG. 2) field and motes 20(2) and 20(4) have 000110 in their Subgroup field.

Each of the motes 20(1)-20(5) sends a message to router 12(1) advertising their IP address, together with a tag that includes a Type field and a Subgroup field. The router 12(1) stores this data in a local database/table representing this information. This local database is shown at reference numeral 50 in FIG. 2. The router 12(1) stores, for each mote, its Type and Subgroup) which is dynamically loaded and tied to/associated with each mote's IP routing table entry. For example, mote 20(1) sends a message to router 12(1) advertising the IP address x.x.1.1 together with the tag {(110,000),(001100)} as shown in FIG. 2. The other motes 20(2)-20(5) send a message advertising their information as shown in FIG. 2. There are entries 51, 53, 55, 57 and 59 in table 50 corresponding to the motes 20(1)-20(5), respectively.

After the router 12(1) has received the advertisements, which include the tag (consisting of Type and Subgroup fields) from the motes 20(1)-20(5), the router 12(1) summarizes this information by performing a logical OR operation on the Type fields and Subgroup fields (for each IP subnet) across the respective motes 20(1)-20(5). The results of this summarization operation are shown in the table 60 in FIG. 2. Thus, for the IP subnet identifier x.x.1.0/24, the router 12(1) performs an OR operation on the Type fields contained in the tags it receives from motes 20(1), 20(2) and 20(3). This involves an OR operation of (110,000), (000, 011) and (000,011) contained in the Type fields from motes 20(1), 20(2) and 20(3), respectively, producing (110,011) for the Type field as shown in entry 62 of table 60, and an OR operation of (001100), (000110) and (001100) contained in the Subgroup fields from motes 20(1), 20(2) and 20(3), respectively, producing (001110) for the summarized Subgroup field as shown in entry 62 of table 60. Similar OR operations are performed to summarize the Type and Subgroup fields across motes 20(4) and 20(5) in IP subnet identifier x.x.2.0/24 for the Type and Subgroup fields shown in entry 64 of table 60. As is known in the art, the "/24" notation indicates a 24 bit part of the 32 bit IP address, i.e. subnet x.x.2.0 with mask 255.255.255.0. This notation is used again throughout this description and in the accompanying figures. The router 12(1) takes the information contained in table 60 and advertises it into the network, i.e., by IP subnet, to other network devices that have routing entries in its routing table. The advertisement forwarding operations of network elements is described further hereinafter.

Reference is now made to FIG. 3 for another example. This example is similar to FIG. 2, but the communication between the router 12(2) and the motes 20(6)-20(10) does not use IP. For example, the communication may be a Layer-2 protocol like Ethernet or other peer-to-peer forwarding protocol used by IoT. The motes 20(6)-20(10) have the same Type and Subgroup field information as in FIG. 2, for purposes of this example. Since the communication between the motes and the router 12(2) is not IP-based, the router 12(2) stores, in its local database 70, the Type and Subgroup field information against a non-IP identifier for each of the motes 20(6)-20(10). This is generally shown as an identifier (ID) in the table 70 in FIG. 3. There are entries 71, 73, 75, 77 and 79 in table 70 corresponding to motes 20(6)-20(10), respectively. The router 12(2) performs the same summarization operations across the motes 20(6)-20 (10) as described above, but instead of storing the summarized information against IP subnet identifiers for the motes, it stores the summarized Type and Subgroup field information against its own IP address, e.g., against the IP address x.x.0.3. This is shown in table 80 with the summarized Type and Subgroup field information associated with the IP address x.x.0.3/32 in the single entry 82 of table 80. The summarization tag (consisting of the Type and Subgroup fields) is appended to IPv4 or IPv6 routing entries in the router 12(2). The router 12(2) advertises the information contained in table 80 to all the network devices for which it has a routing entry in its routing table.

Reference is now made to FIG. 4. The example of FIG. 4 is similar to that of FIG. 3, except that in this example the motes 20(6)-20(10) cannot individually advertise to the router 12(2). Instead, the Type and Subgroup field information is obtained and pre-loaded into the local database 70 of the router 12(2) and each entry in the local database 70 is tied to a non-IP identity for each mote, similar to that of FIG. 3. The pre-loading of this information may be achieved by a network administrator having the appropriate access privileges. The summarization result is the same as that shown in FIG. 3 in table 80. Thus, similar to FIG. 3, the router 12(2) advertises, against its IP address x.x.0.3, the information contained in table 80 to all the network devices for which it is connected.

Figure 5A:
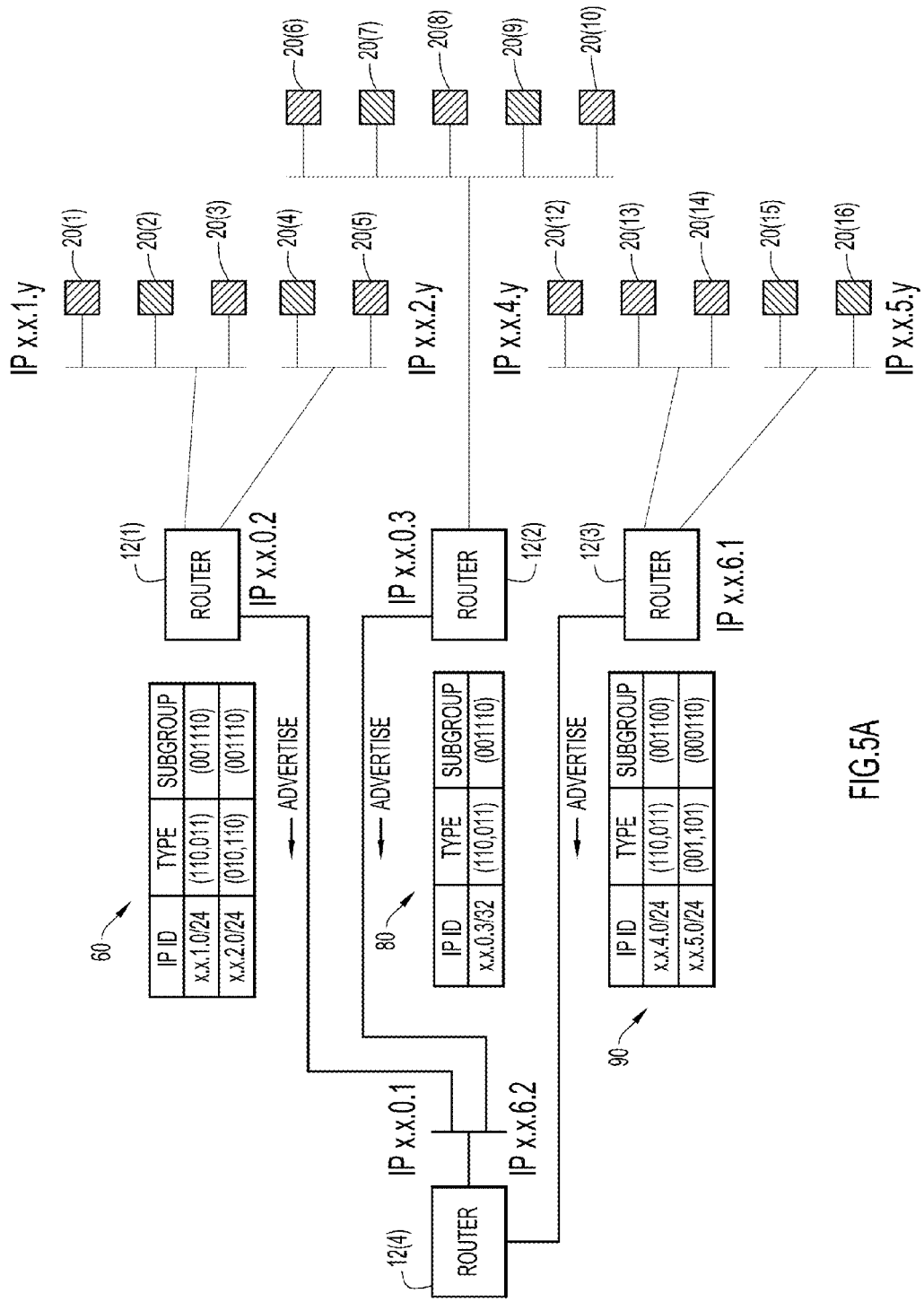
FIG. 5A and FIG. 5B are diagrams illustrating a more complex example of multiple network elements advertising and summarizing capabilities of network-connected devices.
Figure 5B:
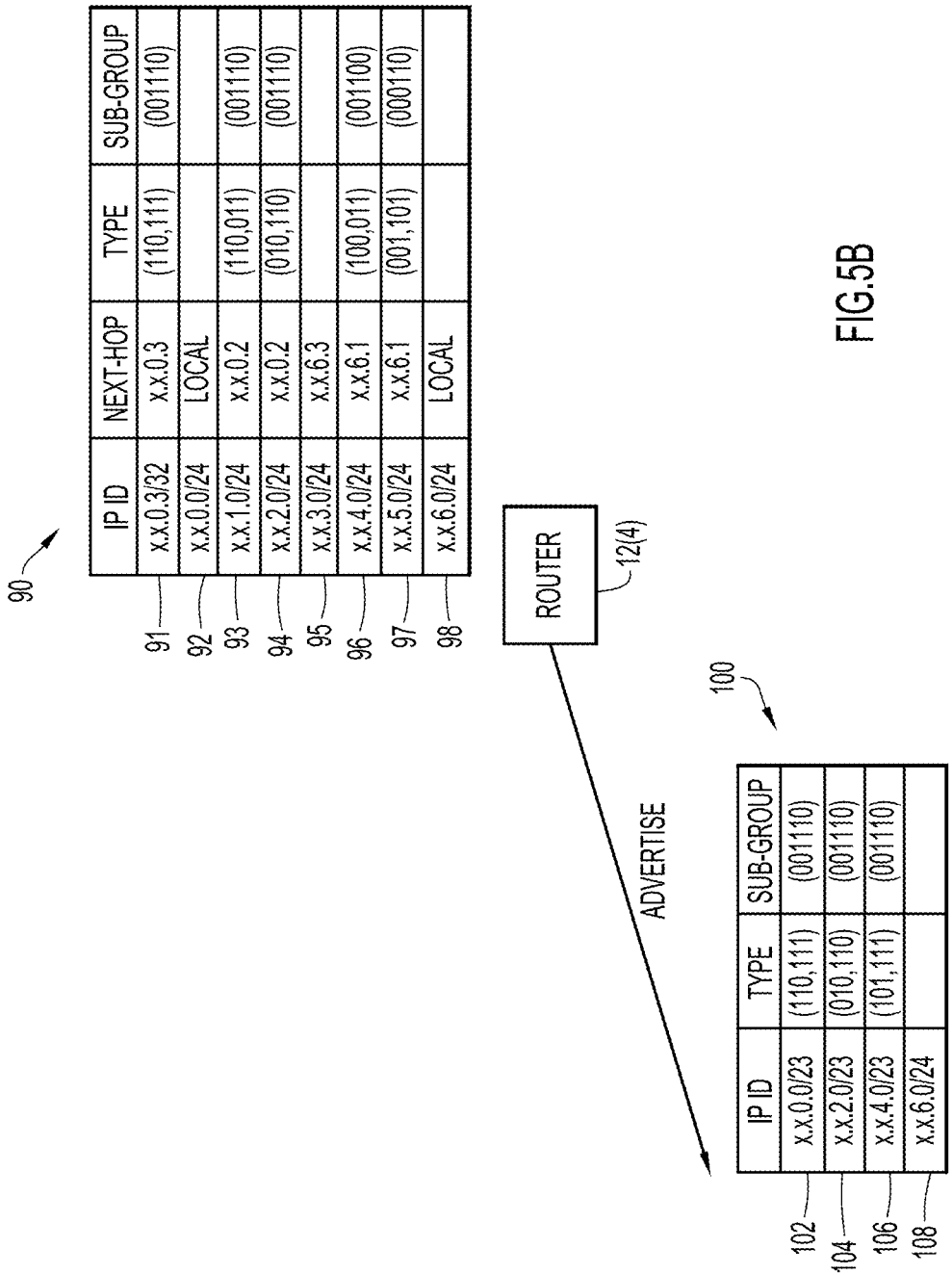

Turning now to FIGS. 5A and 5B, an example is shown to illustrate how network elements aggregate Type and Subgroup field information when advertising to other network devices. In this example, there are a plurality of motes 20(1)-20(5) in the same configuration (with the same Type and Subgroup field information) in IP subnets x.x.1.y and x.x.2.y connected to router 12(1) as described above in connection with FIG. 2. As shown in FIG. 5A, there are a plurality of motes 20(6)-20(10) in the same configuration (with the same Type and Subgroup field information) connected to router 12(2) as described above in connection with FIG. 4. In addition, there are a plurality of motes 20(12)-20(15) in IP subnets x.x.4.y and x.x.5.y connected to router 12(3), where motes 20(12)-20(14) have the same Subgroup (manufacturer) and motes 20(15) and 20(16) have the same Subgroup (manufacturer), according to the cross-hatching patterns shown in FIG. 5A (which is the same as the cross-hatching patterns used in FIGS. 2-4). The IP address of router 12(3) is x.x.6.1.

Router 12(4) in FIG. 5A is connected to routers 12(1), 12(2) and 12(3). Router 12(1) advertises the Type and Subgroup field information (summarized as described above in connection with FIG. 2) contained in table 60 to router 12(4). Router 12(2) advertises the Type and Subgroup field information (summarized as described above in connection with FIG. 4) contained in table 80 to router 12(4). Router 12(3) advertises the Type and Subgroup field information (that it summarizes using the techniques described above) contained in table 90 to router 12(4). When advertising to router 12(4), routers 12(1), 12(2) and 12(3) send a message to router 12(4) containing the content of the tables 60, 80, and 90, respectively.

Turning now to FIG. 5B, upon receiving the advertisements from routers 12(1), 12(2) and 12(3), router 12(4) stores/updates its local routing table/database 90 to include entries for the Type and Subgroup field information contained in those advertisements. The first entry 91 in local routing table 90 is for the next hop IP address x.x.0.3 for the information contained in table 80 in the advertisement from router 12(2). There is a single entry in table 80 and that information corresponds to the entry 91 in table 90. Entry 92 is an entry not associated with any of the advertisements in FIG. 5A, but is for the local subnet between routers 12(4), 12(1) and 12(2). Entry 93 corresponds to the first entry in table 60 for the advertisement from router 12(1). Entry 94 corresponds to the second entry in table 60 for the advertisement from router 12(1). Entry 95 is an entry not associated with any of the advertisements in FIG. 5A, this is for a subnet being advertised by router 12(3) that does not happen to have any motes on it, but has other IP nodes that are reachable. Entries 96 and 97 correspond to the two entries in table 90 for the advertisement received from router 12(3). Entry 98 is an entry not associated with any of the advertisements in FIG. 5A, again this entry is for the local subnet between routers 12(4) and 12(3). Entry 98 is included in this example to show that there can be routing entries that do not have any corresponding Type and Subgroup fields and that the two routing entry types can coexist with each other.

In the table 100 that router 12(4) advertises to other network elements (upstream from router 12(4)), there are entries 102, 104, 106 and 108. Entry 102 is associated with IP ID x.x.0.0/23 and is associated with advertisements received on IP subnet x.x.0.y. The router 12(4) summarizes the Type and Subgroup fields for entries 91, 92 and 93 in table 90. Entry 92 has no Type and Subgroup field information, but is still summarized in with entries 91 and 93. For entries that do not have Type and Subgroup, their Type and Subgroup fields are set to 0 (all bits are 0) for doing any OR operation for summarization or any AND operation for query forwarding. Thus, the router 12(4) summarizes (by a logical OR operation) the Type fields and Subgroup fields for entries 91 and 93. Thus, the Type and Subgroup fields for entry 102 in table 100 are the results of logical OR operations of the Type fields and Subgroup fields, respectively, for entries 91 and 93 in table 90. In generating entry 104, router 12(4) summarizes entries 94 and 95 in table 90, and since entry 95 has no Type and Subgroup fields, it copies the Type and Subgroup field of entry 94 into entry 104. The router 12(4) generates entry 106 by summarizing (with a logical OR operation) the Type and Subgroup fields of entries 96 and 97, respectively, in table 90. Entry 108 is just a copy of entry 98 in table 90.

In summary of examples described in connection with FIGS. 2-4, 5A and 5B, the Type and Subgroup fields are not part of the IPv6 address itself, but are fields that could either be passed around along with the IPv6 address/subnet advertisements by a routing protocol itself (like an opaque data field), or by another application that specifically passes around these fields tied to the IPv6 address/subnet. In either case the Type and Subgroup fields would either be added as additional fields to the routing table, or more likely be in an adjunct table to the routing table. There are numerous methods capable of propagation of the Type and Subgroup fields along with the routing information. For example, most of the routing protocols have mechanisms for transporting opaque data fields associated with routing/network entries The advantage of tying the Type and Subgroup information to an aggregatable network addressing/routing table (like IPv6 address/subnet routing table or physical location routing table), is that a request for information can be sent to the network for a capability (Type) and possibly further filtered by Subgroup. In this way, a single request (query) would be routed through the network and at any routing node, several thing can happen. First, the request flows to a point where, for it to continue, it would need to follow multiple paths, i.e., be split. In this case, the request could be: (a) replicated and each copy follows a possible path, or (b) dropped and a reply message is generated to inform the requestor of the multiple paths. Second, the request is routed to a point in the network where the requested combination does not match any possible forwarding path, i.e. a dead-end. In this case, the request could be: (a) silently dropped, or (b) dropped and a reply message is generated to inform the requestor of the dead-end. The third possibility is that the request has reached a node/mote where it is answered.

Using these techniques, a single request could be sent into the network for a particular IPv6 subnet (of any theoretical size) with a Type and Subgroup designation and the result could be data from all such nodes/motes within that subnet that match the subnet and type. This could be considered to be something like a reverse multicast, where a single request packet can automatically solicit many responses, without the requestor having to have complete a priori information about the nodes/motes that will answer.

Figure 6:
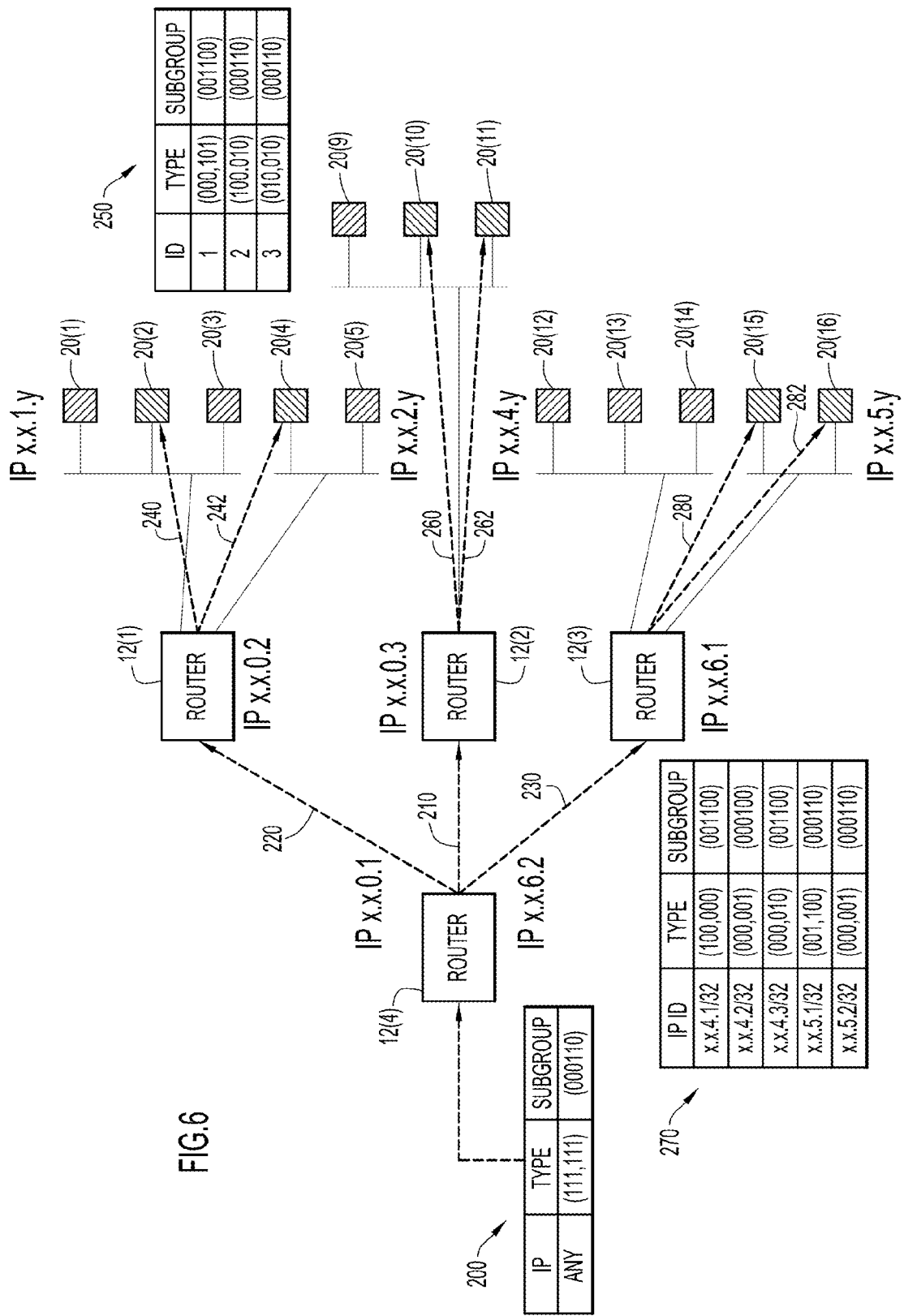
FIGS. 6-12 are diagrams illustrate examples of processing and forwarding of various types of queries for the example configuration of FIGS. 5A and 5B.

To this end, reference is now made to FIGS. 6-12, which illustrate examples of query processing and forwarding. The example configurations of FIGS. 2-4, 5A and 5B are re-used in these examples. Referring first to FIG. 6, an example is shown in which a query 200 is received at router 12(4). The query 200 is for any IP subnet, and specifies Type (111,111) and Subgroup (000110). To find entries with matching Type fields, the router 12(4) performs a logical AND operation with each entry in its local database 90 (FIG. 5B), and if the result of the AND operation is non-zero, the entry matches the query. For this example, the results of AND operation of the query Type (111,111) with each of the entries in local database 90 is non-zero for entries 91, 93, 94, 96 and 97. Next, a logical AND operation is made between the Subgroup of the query and the Subgroup of each of the entries with matching Type fields, and the results need to equal the Subgroup of the query. This latter criterion for Subgroup matching is met only for entries 91, 93, 94 and 97. That is, when the Subgroup value (000110) of the query is ANDed with the Subgroup fields of entries 91, 93, 94, 96 and 97, the result matches the Subgroup value (000110) of the query only for entries 91, 93, 94 and 97.

Once router 12(4) has found the entries that match the query 200, it forwards that query on to the connected routers associated with those matching entries in its local database/table 90. In FIG. 6, the forwarded queries are shown by dotted lines with arrows from router 12(4) to each of the other routers 12(1), 12(2) and 12(3), and from each of the routers 12(1), 12(2) and 12(3) to an associated network-connected device, as described below. In this example, entry 91 is associated with router 12(2). Therefore, at 210, router 12(4) forwards the query 200 to router 12(2). Entries 93 and 94 in table 90 is associated with router 12(1), so at 220, the router 12(4) forwards the query 200 to router 12(1). Entry 97 in table 90 is associated with router 12(3), so at 230, router 12(4) forwards the query 200 to router 12(2).

Routers 12(1), 12(2) and 12(3) are each leaf nodes in that there are no further routers or switches between them and the network-connected devices. When these routers receive the query 200, each performs similar operations to determine matching entries in their local databases/tables. Starting with router 12(1), it performs an AND operation with the Type field in the query 200 and the Type fields for each entry in its table 50 (shown in detail in FIG. 2). There is a non-zero result of the AND operation between the Type field of the query 200 and all the Type fields of the entries in table 50. Next, the Subgroup field of the query is ANDed with each entry in table 50. The results of these AND operations is equal to the Subgroup field of the query only for entries 53 and 57. Since router 12(1) is a last hop router, a further check is made between the Subgroup of the query 200 and the Subgroup of the matching entries for the motes (IoT) devices associated with the matching entries. This final matching determination proves true for entries 53 and 57. Therefore, router 12(1) forwards the query to motes 20(2) and 20(5) as shown at reference numerals 240 and 242, respectively.

Router 12(2) performs similar matching operations when it receives the query 200 with respect to its local database/table 250, and determines that it needs to forward the query 200 to motes 20(10) and 20(11), for example, as shown at reference numerals 260 and 262, respectively.

Similarly, router 12(3) performs matching operations when it receives the query 200 with respect to its local database/table 270. Router 12(3) determines that it needs to forward the query 200 to motes 20(15) and 20(16) as shown at reference numerals 280 and 282.

Figure 7:
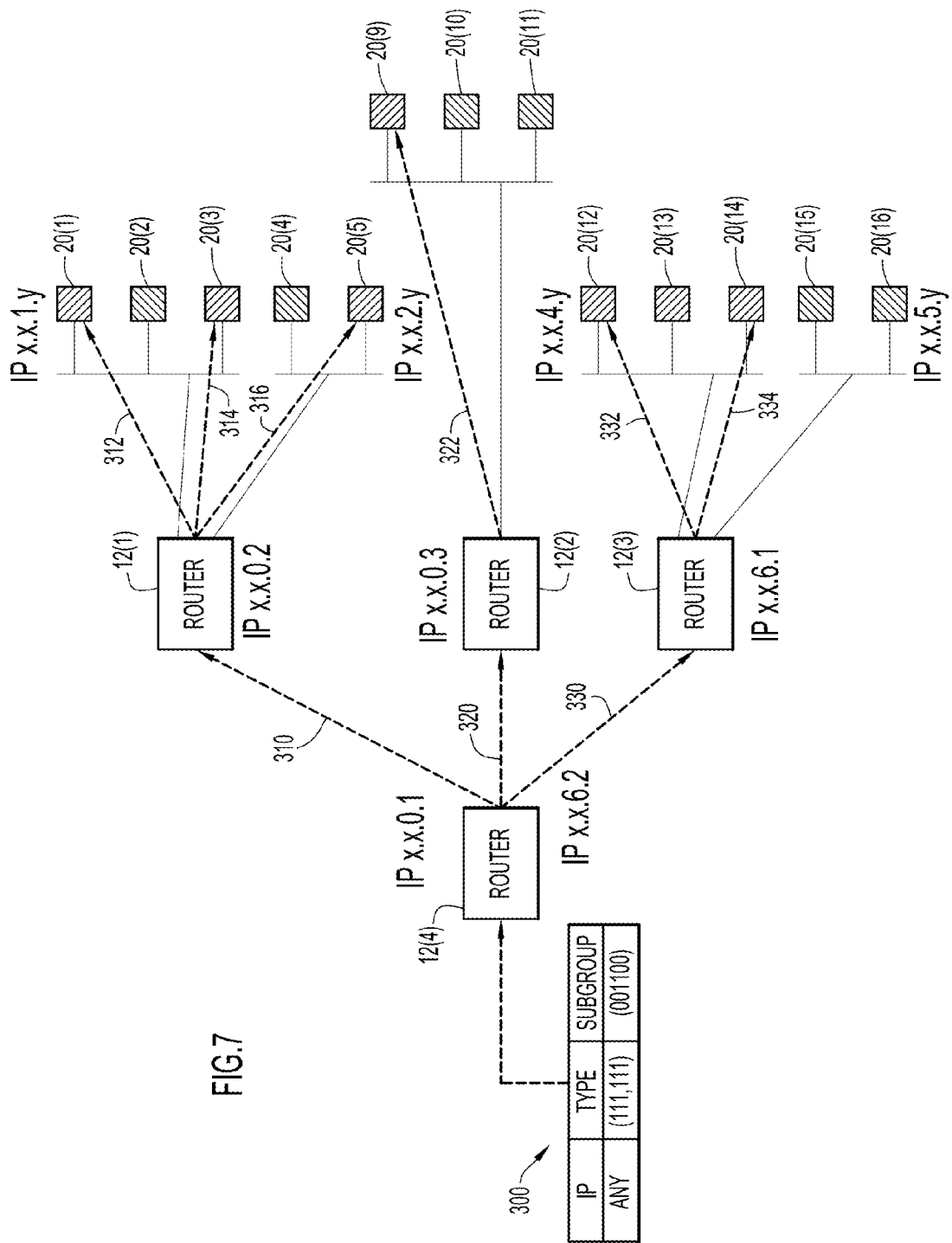

Reference is now made to FIG. 7 for a further query forwarding example. The query in this example is shown at reference numeral 300. Query 300, like query 200, has Type (111,111), but unlike query 200, it has Subgroup value (001100). When router 12(4) receives query 300, it determines that entries 91, 93, 94 and 96 in database 90 (FIG. B) match. Based on the matching entries 91, 93, 94 and 96, router 12(4) determines to forward the query 300 to router 12(1) as shown at 310, to router 12(2) as shown at 320 and to router 12(3) as shown at 330. After performing the matching analysis as described above, router 12(1) determines to forward the query 300 to motes 20(1), 20(3) and 20(5) as shown at reference numerals 312, 314 and 316, respectively. Note that the Subgroup field of the query 300 matches the Subgroup field associated with motes 20(1), 20(3) and 20(5). Router 12(2) determines to forward the query 300 to mote 20(9) as shown at 322, and router 12(3) determines to forward the query 300 to motes 20(12) and 20(14), as shown at reference numerals 332 and 334, respectively.

Figure 8:
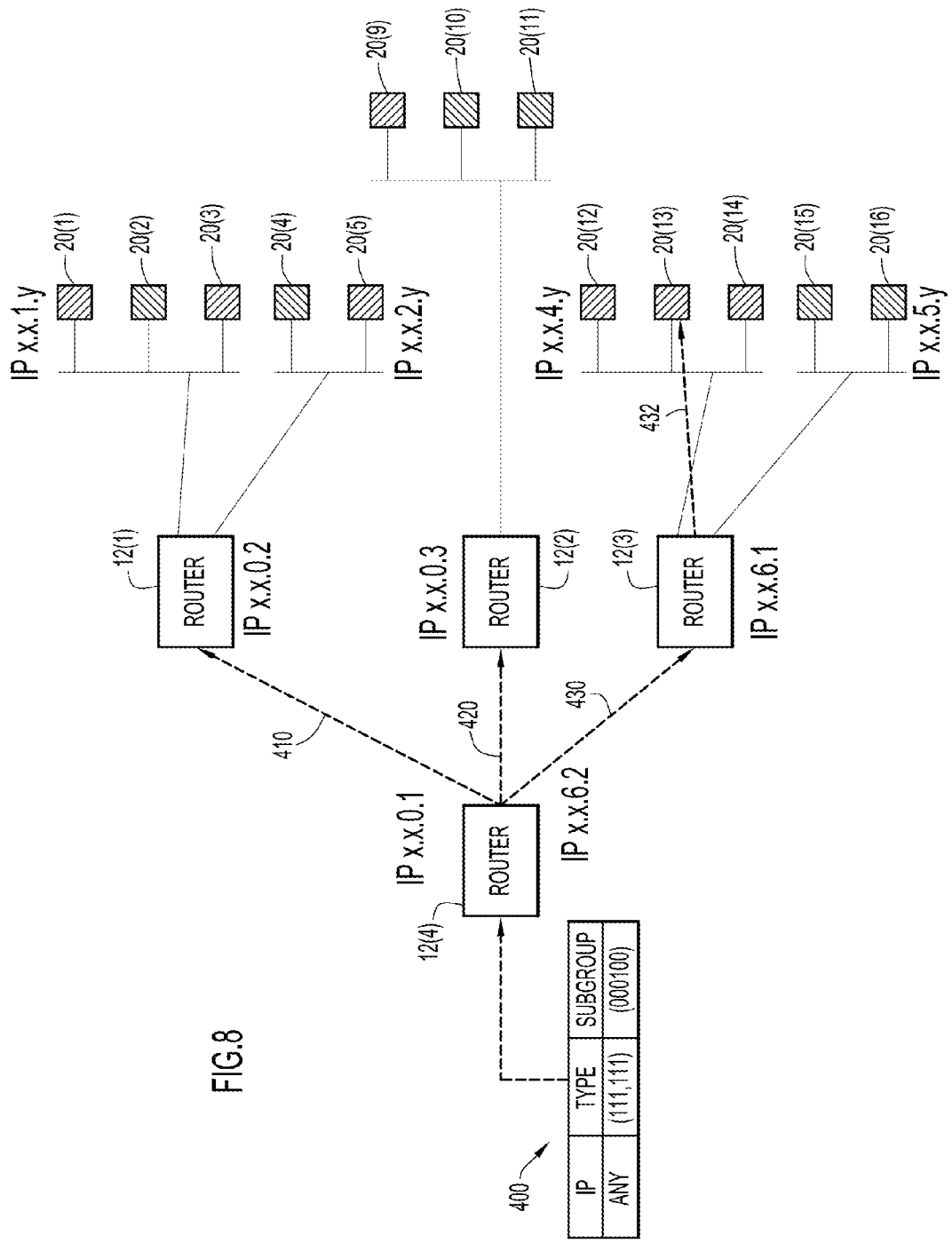

Turning now to FIG. 8, a query forwarding example is described that has a much different outcome than the examples shown in FIGS. 6 and 7. The query 400 in this example has a Type field that is the same as that in FIGS. 6 and 7, but the Subgroup is (000100). When router 12(4) performs matching analysis with query 400, it determines that entries 91, 93, 94, 96 and 97 in database 90 (FIG. 5B) match the query 400. The router 12(4) therefore forwards the query 400 to routers 12(1), 12(2) and 12(3) as shown at 410, 420, and 430, respectively. However, when router 12(1) performs matching analysis for query 400, it determines that while there are several entries with Type fields that match the query 400, none of those entries match the Subgroup field of the query 400 because none of the entries in the local database 70 (FIG. 4) associated with motes 20(1)-20(5) matches the Subgroup field of the query 400. Again, it is pointed out that since router 12(1) is a last hop router, the additional step is needed of matching the Subgroup field of the query 400 to the Subgroup field for a mote hanging off router 12(1). Therefore, router 12(1) does not forward the query 400 on to any of its associated motes. The query 400 dies with router 12(1). Similarly, none of the entries in the local database 250 (FIG. 6) for router 12(2) has a Subgroup field that matches the Subgroup field of the query 400. Therefore, router 12(2) does not forward the query on to any of its associated motes.

The situation is different for router 12(3) in the example of FIG. 8. Router 12(3) determines that one entry in its local database 270 (FIG. 6), for mote 20(13) matches the query 400, because, in addition to the results of the AND operations for the Type field and Subgroup field matching, the entry in the local database 270 has a Subgroup field that is equal to the Subgroup field of the query 400. Consequently, router 12(3) forwards the query 400 only to mote 20(13) as shown at reference numeral 432.

Figure 9:
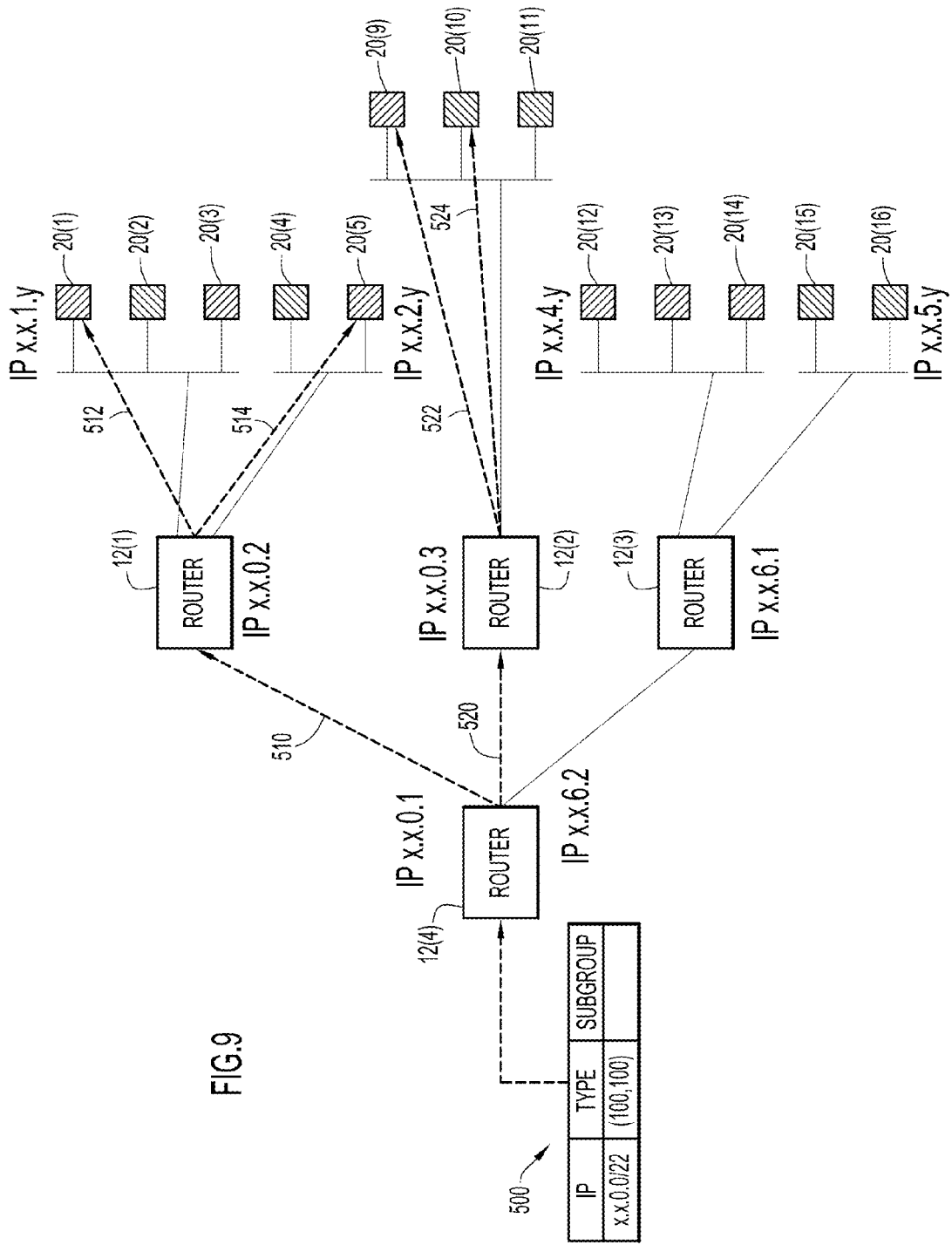

Reference is now made to FIG. 9. FIG. 9 shows a query forwarding example when the query contains no value for the Subgroup field, but specifies a particular IP subnet. This means that the query is seeking a response from all network-connected devices that have a matching Type field, within a particular IP subnet. The query 500 in the example of FIG. 9 comprises a Type field of (100,100) and specifies an IP subnet, i.e., x.x.0.0/22. The router 12(4) scans through its routing table to find a match with the /22 subnet, x.x.0.0/22. Then, for each routing entry that matches at the routing layer, the router 12(4) does a Type field match (yes/no) then a Subgroup field match (yes/no) for those entries that match the Type field of the query.

Thus, in this example, the router 12(4) performs matching analysis with respect to query 500 and determines that entries 91, 93 and 94 in local database 90 (FIG. 5B) match the query 500. Note, that entry 95 is in the subnet (x.x.0.0/22) of the query, but does not have any Type or Subgroup specified so it is not considered a match for the query. Also the entries 96 and 97 have Type fields that would match the query 500, but entries 96 and 97 are not in the subnet (x.x.0.0/22) in the query. Router 12(4) therefore forwards the query 500 to routers 12(1) and 12(2) as shown at 510 and 520. Router 12(1) finds two entries, for mote 20(1) and mote 20(5), which match query 500. Router 12(1) forwards the query 500 to motes 20(1) and 20(5) as shown at reference numerals 512 and 514. Router 12(2) finds two entries, for mote 20(9) and 20(10) that match the query 500, and forwards query 500 to these motes at reference numerals 522 and 524. Router 12(4) does not forward query 500 to router 12(3) because it is in a subnet that does not satisfy the query 500.

Figure 10:
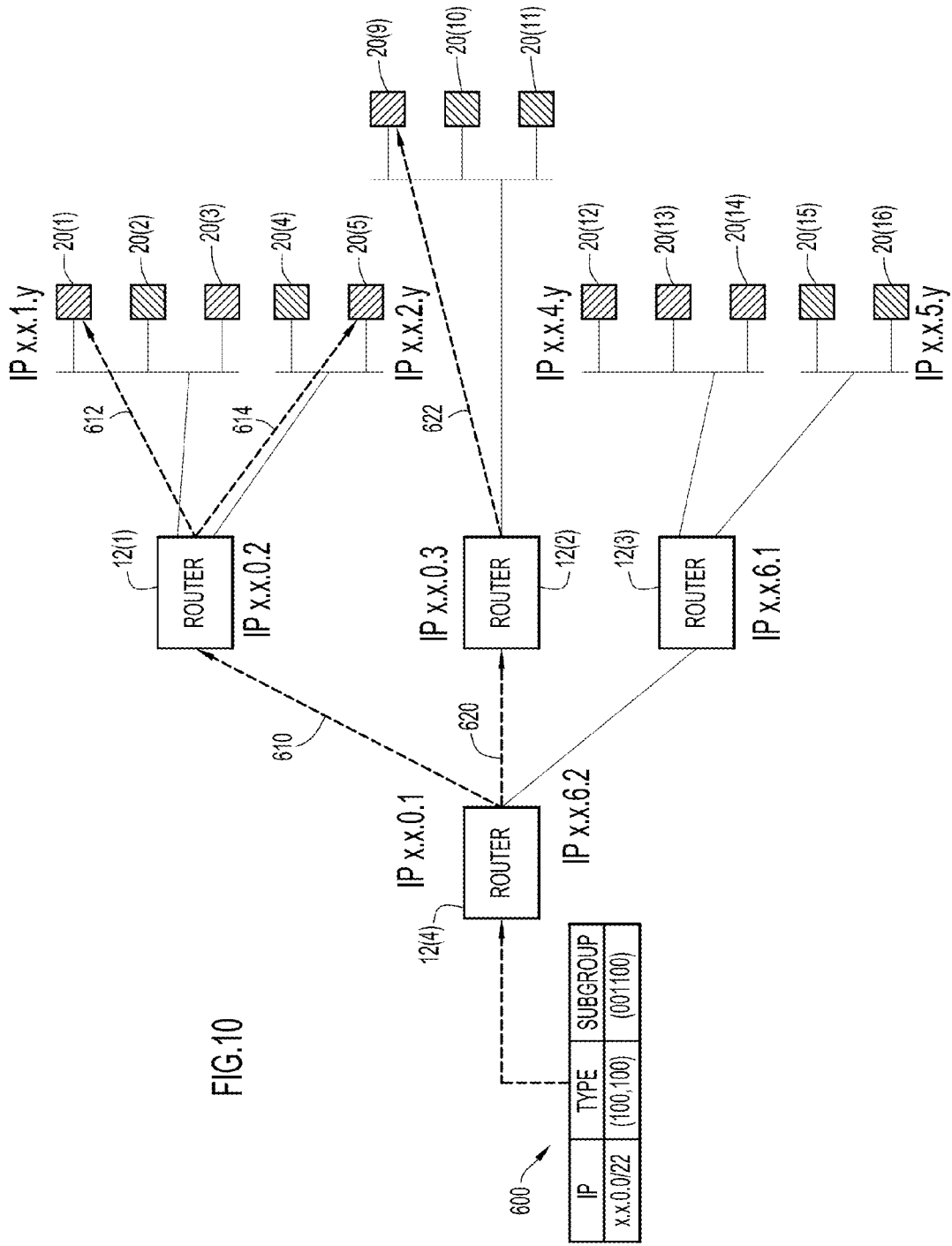

FIG. 10 illustrates a forwarding example for a query 600 that is similar to query 500 of FIG. 9, except that query 600 further specifies Subgroup (001100). Upon analyzing query 600, router 12(4) determines to forward the query only to routers 12(1) and 12(2) as shown at reference numerals 610 and 620, due to the subnet specified in the query. Router 12(1) forwards query 600 to motes 20(1) and 20(5) as shown at 612 and 614 because they both have Type fields that match the Type field and Subgroup fields that match the Subgroup field in the query 600. Router 12(2) determines that both motes 20(9) and 20(10) have Type fields that match the Type field of query 600, but only mote 20(9) has a Subgroup field that matches the Subgroup field in the query 600, and therefore it forwards the query 600 only to mote 20(9).

Figure 11:
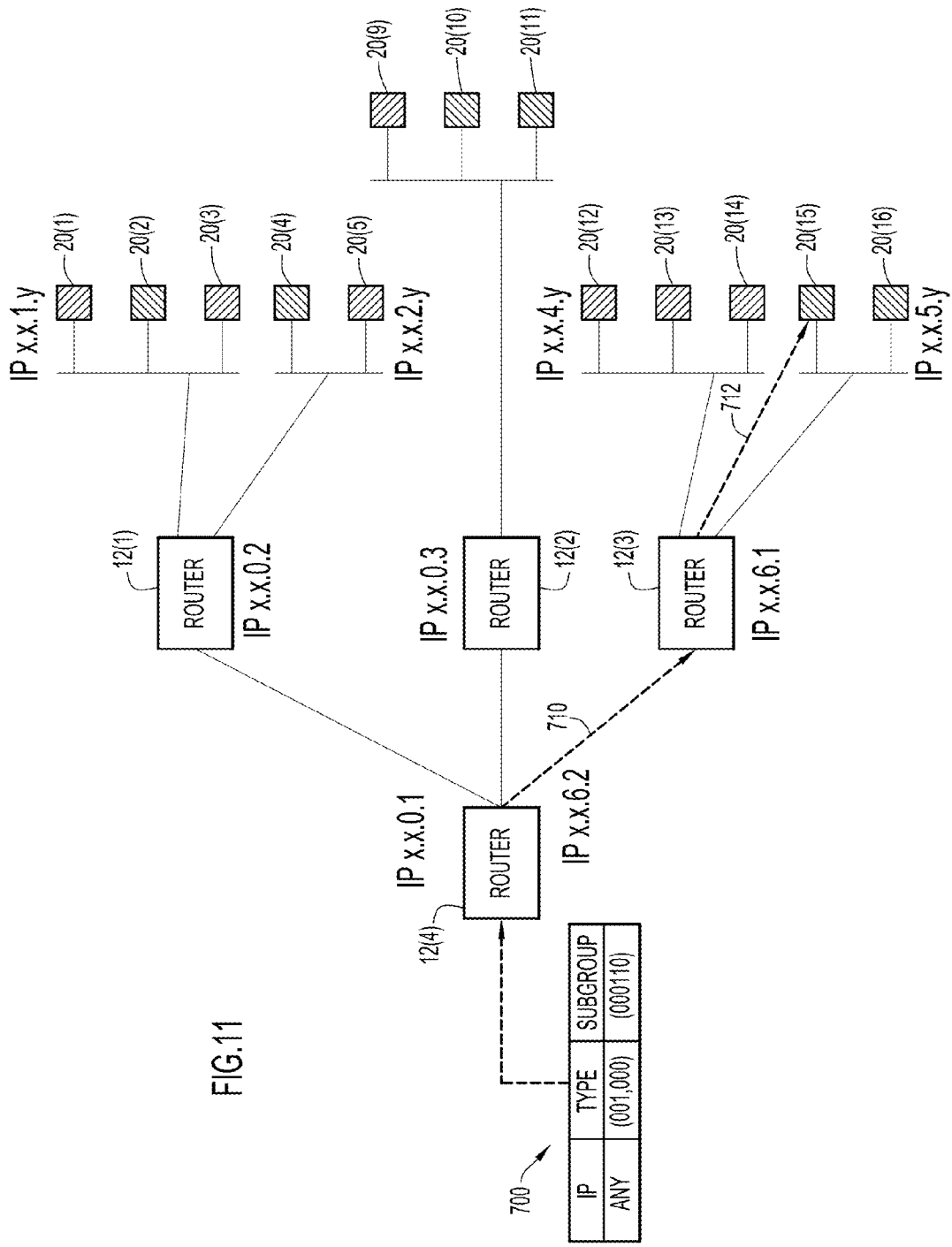

FIG. 11 illustrates a forwarding example in which the query is not limited to an IP subnet, but specifies a Type field and Subgroup field. The query 700 specifies a Type of (001,000) and a Subgroup of (000110). When router 12(4) analyzes the query 700, it determines that only entry 97 matches the query 700. Router 12(4) therefore forwards query 700 to router 12(3) as shown at reference numeral 710, and does not forward the query to routers 12(1) and 12(2). Router 12(3) determines that only the entry in its table 270 (FIG. 6) for mote 20(15) matches query 700 and therefore forwards query at 712 to mote 20(15).

Figure 12:
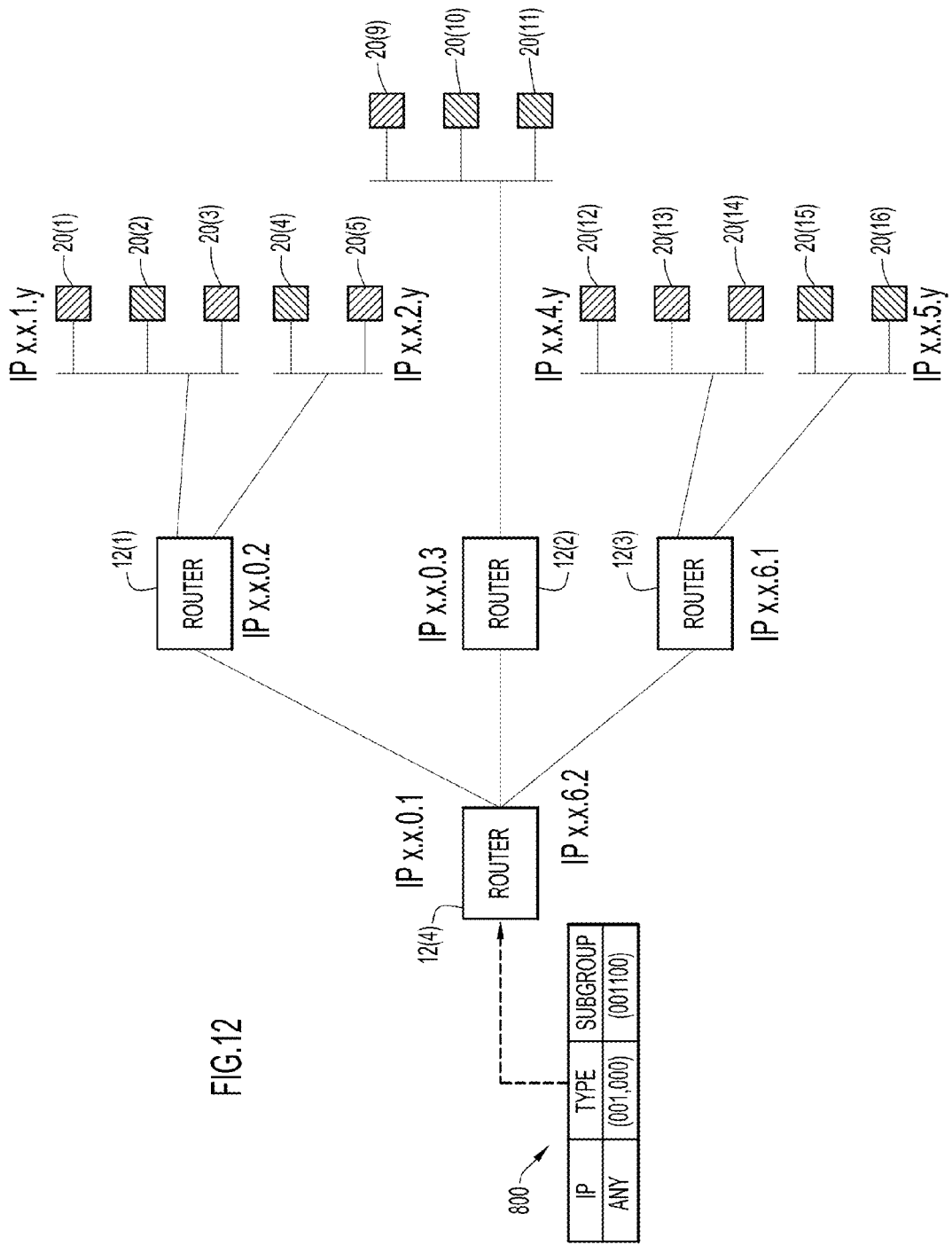

Turning now to FIG. 12, an example is described in which the query is not forwarded beyond router 12(4). The query 800 in this example is not limited to any particular IP subnet, but has a Type of (001,000) and a Subgroup of (001100). Router 12(4) analyzes the query 800 and determines that only entry 97 (FIG. 5B) produces a non-zero result when the Type field of the query 800 is ANDed with the Type field of entry 97. However, when the Subgroup field of the query 800 is ANDed with the Type field of entry 97, the result is not equal to the Subgroup field of the query 800. Therefore, it is not a match to entry 97. As a result, the router 12(4) does not forward the query 800 on to any other devices in the network.

Queries may be propagated in an "allcast" manner. In other words, a network element may find all entries that match a query, and forward the query based on all of the matches found. That is, when a plurality of routing entries are determined to match the query, the query is forwarded based on all of the plurality of routing entries determined to match the query. If multiple routing entries match the query and they all have the same next-hop only one copy of the query is forwarded to that next-hop.

In another form, a network element may forward a query in an "anycast" manner. In this case, the network element forwards the query based on the first match that it finds, and it can be any match. Once the network element has found a match, it forwards the query on appropriately and stops looking for any further matches. Thus, in this form, a determination is made of a first routing entry that matches the query and once that determination is made, any further analyzing of other routing entries for matches, even if there are other routing entries that match the query, is terminated. The query is forwarded based on the first routing entry that matches the query.

Figure 13:
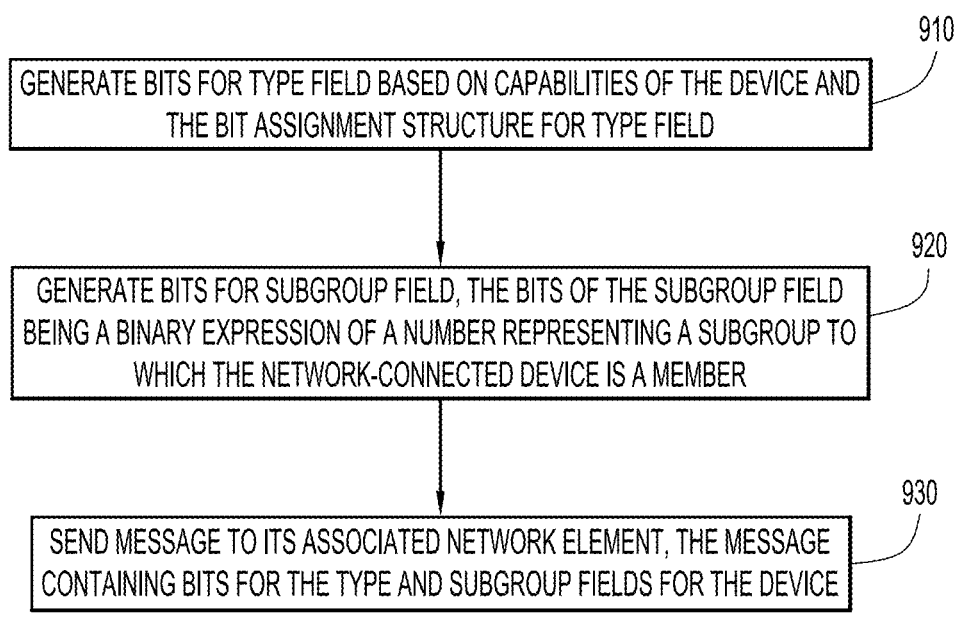
FIG. 13 is a flow chart generally illustrating operations performed by, or on behalf of a network-connected device, to provide capability Type and Subgroup information to a network element to which the network-connected device is associated, in accordance with certain example embodiments.

Turning now to FIG. 13, a flow chart 900 is provided that depicts and summarizes the operations performed by a network-connected device/mote in advertising its capabilities to its associated network element in the network. At 910, the network-connected device generates bits for the Type field based on capabilities of the device and the bit assignment structure for the Type field. At 920, the network-connected device generates bits for the Subgroup field based on manufacturer/vendor for the device (or other criteria) and the integer number assigned for that manufacturer/vendor (or other criteria). The bits of the Subgroup field are a binary expression of a number representing a Subgroup to which the network-connected device is a member. For example, the Subgroup field is an integer number assigned to a manufacturer/vendor for the device.

At 930, the network-connected device sends a message to its associated network element, the message containing bits for the Type and Subgroup fields for the device. As explained above in connection with FIG. 4, if the network-connected devices cannot advertise their capabilities to the router, a network administrator can pre-load the Type and Subgroup field information into the local database of the router, tagged or associated with the IP ID in the routing entry for that device or in a separate ID table entry for that device.

Figure 14:
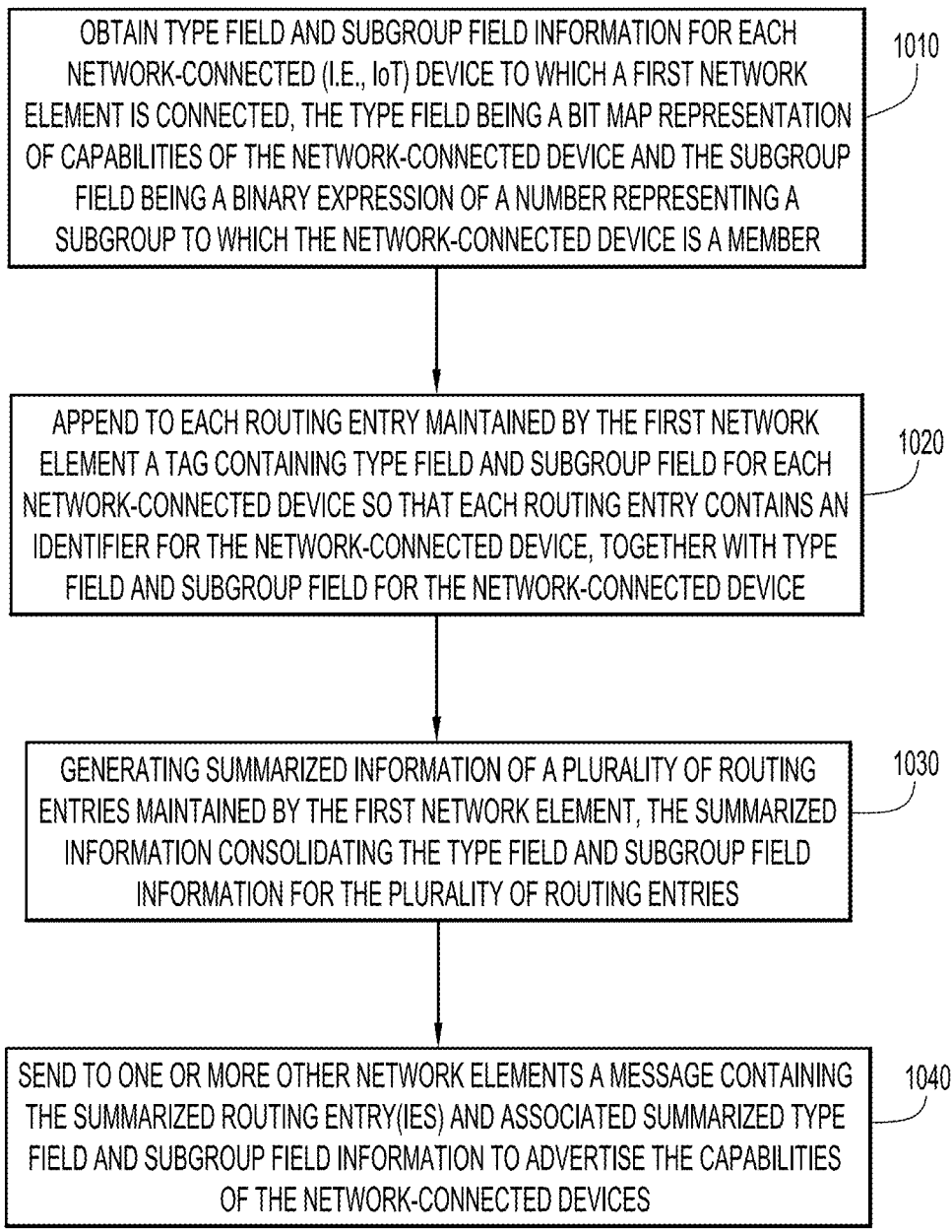
FIG. 14 is a flow chart generally illustrating operations performed in a last hop network element in summarizing and advertising capabilities of associated network-connected devices, in accordance with certain example embodiments.

Turning now to FIG. 14, a flow chart 1000 is shown depicting summarization operations performed in a network element (generically referred to as a first network element) that receives or otherwise is pre-loaded with Type field and Subgroup field information for network-connected devices connected to that network device. At 1010, at a first network element configured to perform routing or switching operations in a network, Type field and Subgroup field information is obtained for each of a plurality of network-connected (IoT) devices to which the first network element is connected, the Type field being a bit map representation of capabilities of the network-connected device and the Subgroup field being a binary expression of a number representing a subgroup to which the network-connected device is a member. At 1020, the first network element appends to each of a plurality of routing entries maintained by the first network element a tag comprising a Type field and a Subgroup field for each network-connected device so that each routing entry comprises an identifier for the network-connected device, together with the Type field and Subgroup field for the network-connected device. At 1030, the first network element generates summarized information of a plurality of routing entries maintained by the first network element, the summarized information consolidating the Type field and Subgroup field information for the plurality of routing entries. As explained above, generating the summarization information involves performing a logical OR operation on the Type fields for the plurality of routing entries to generate a single summarized Type field and performing a logical OR operation on the Subgroup fields for the plurality of routing entries to generate a single summarized Subgroup field. This summarization is performed for routing entries within the same subnet to generate a tag containing a summarized Type field and summarized Subgroup field for each subnet, and the tag is appended to a subnet identifier for each corresponding subnet. At 1040, the first network element advertises capabilities of the network-connected devices connected to it by sending to one or more other network elements a message comprising the summarized routing entry(ies) and associated summarized Type field and Subgroup field information. The message may comprise the subnet identifier and associated tag containing the summarized Type field and summarized Subgroup field for a corresponding subnet. If the network connected devices connected to this first network device are not associated with an IP address (they use an alternative to IP for connectivity) then this first network element will summarize the Type fields and separately the Subgroup fields and associate them with this first network element's own IP address in its routing table. This first network element's own IP address, with associated Type and Subgroup fields, may be further summarized with other entries, as described above, when this network element advertises this information to other network elements.

Figure 15:
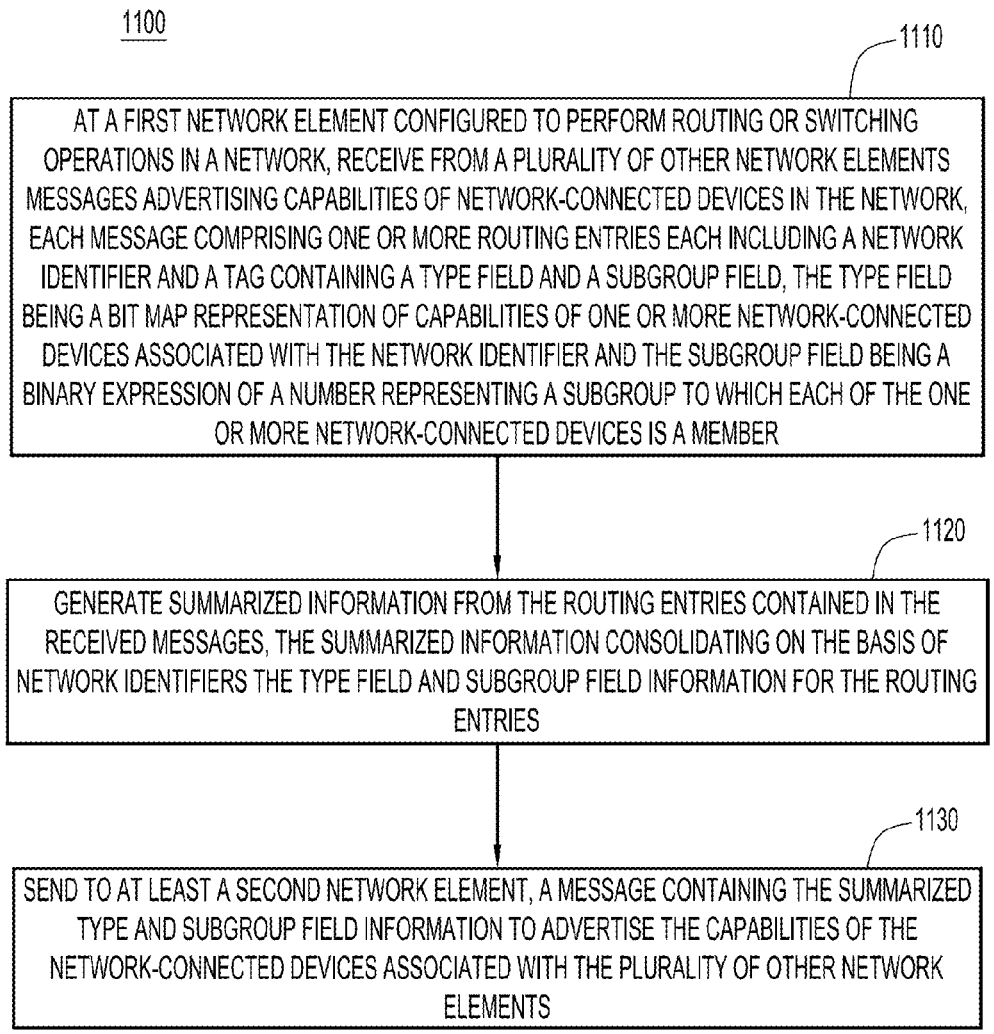
FIG. 15 is a flow chart generally illustrating operations performed by a network element, which is not a last hop network element, in summarizing and propagating advertisements in the network, in accordance with certain example embodiments.

Reference is now made to FIG. 15. FIG. 15 is a flow chart 1100 depicting operations performed by a network element (again, generically referred to as a first network element) that receives advertisements from other network elements. At 1110, at a first network element configured to perform routing or switching operations in a network, messages are received from a plurality of other network elements, the messages advertising capabilities of network-connected devices in the network. Each message comprises one or more routing entries each including a network identifier and a tag including a Type field and a Subgroup field, the Type field being a bit map representation of capabilities of one or more network-connected devices associated with the network identifier and the Subgroup field being a binary expression of a number representing a subgroup to which each of the one or more network-connected devices is a member. These routing entries may have already been summarized to some extent by a previous network element. At 1120, the first network element generates summarized information from the routing entries contained in the received messages, the summarized information consolidating on the basis of network identifiers the Type field and Subgroup field information for the routing entries. As explained above, the summarization information is generated by performing a logical OR operation on the Type fields associated with the plurality of routing entries to generate a single summarized Type field and performing a logical OR operation on the Subgroup fields associated with the plurality of routing entries to generate a single summarized Subgroup field. This summarization step is performed for/across routing entries within the same subnet. At 1130, the first network element advertises the capabilities of the network-connected devices associated with the plurality of other network elements by sending to at least a second network element, a message comprising each network identifier and its associated summarized Type field and Subgroup field information. The message comprises the subnet identifier and associated tag containing the summarized Type field and summarized Subgroup field.

Figure 16:
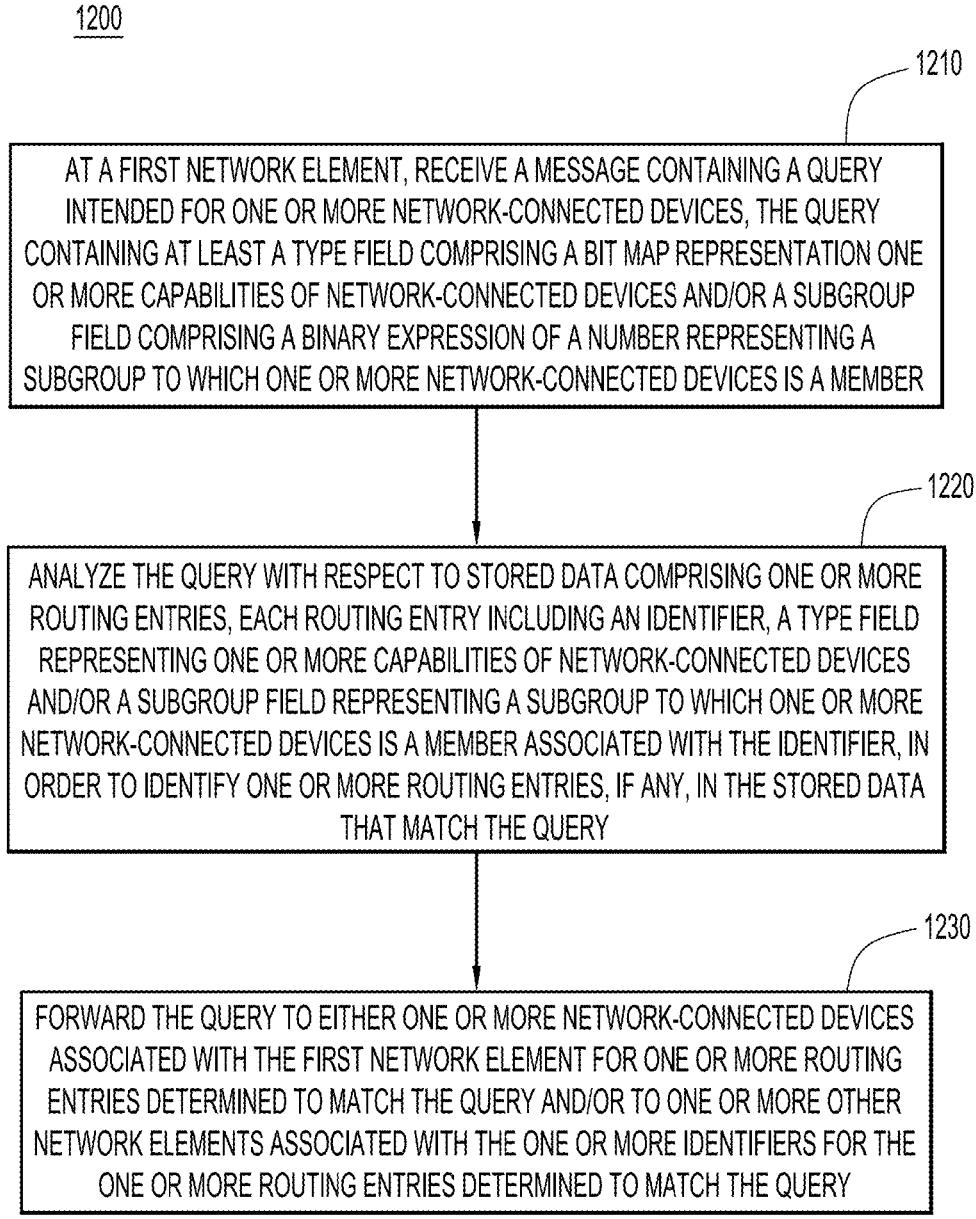
FIG. 16 is a flow chart generally illustrating operations performed by a network element in processing and forwarding a query, in accordance with certain example embodiments.

Turning now to FIG. 16, a flow chart 1200 is described for the operations performed by a network element (generically referred to as a first network element) when processing and forwarding a query. At 1210, a first network element receives a message including a query intended for one or more network-connected devices, the query containing at least a Type field comprising a bit map representation of one or more capabilities of network-connected devices and/or a Subgroup field comprising a binary expression of a number representing a subgroup to which one or more network-connected devices is a member. At 1220, the first network element analyzes the query with respect to stored data comprising one or more routing entries, each routing entry including an identifier, a Type field representing one or more capabilities of network-connected devices and/or a Subgroup field representing a subgroup to which one or more network-connected devices is a member, in order to identify one or more routing entries, if any, in the stored data that match the query. The analyzing operation may involve performing a logical AND operation between the Type field of the query and the Type field in each routing entry, and determining a match of a routing entry to the query when a result of the AND operation of the Type field of the query and the Type field of the routing entry is non-zero. When the query further includes a Subgroup field comprising a binary expression of a number representing a subgroup of network-connected devices to which the query is intended, and the analyzing operation comprises analyzing the query with respect to the stored data for the one or more routing entries, wherein each routing entry further includes a Subgroup field representing a subgroup of network-connected devices in the subnet associated with the subnet identifier for the routing entry. Moreover, for any routing entries determined to have a Type field that matches the query, a logical AND operation is performed between the Subgroup field of the query and the Subgroup field of the routing entry, to determine a match of a routing entry to the query when a result of the AND operation of the Subgroup field of the query and the Subgroup field of the routing entry is equal to the Subgroup field of the query. Further still, when the query further includes a network identifier specifying a subnet to which the query applies, the analyzing comprises analyzing query with respect to routing entries that are within the subnet of the query. At 1230, the first network element forwards the query to either one or more network-connected devices associated with the first network element for one or more routing entries determined to match the query and/or to one or more other network elements associated with the one or more identifiers for the one or more routing entries determined to match the query.

Figure 17:
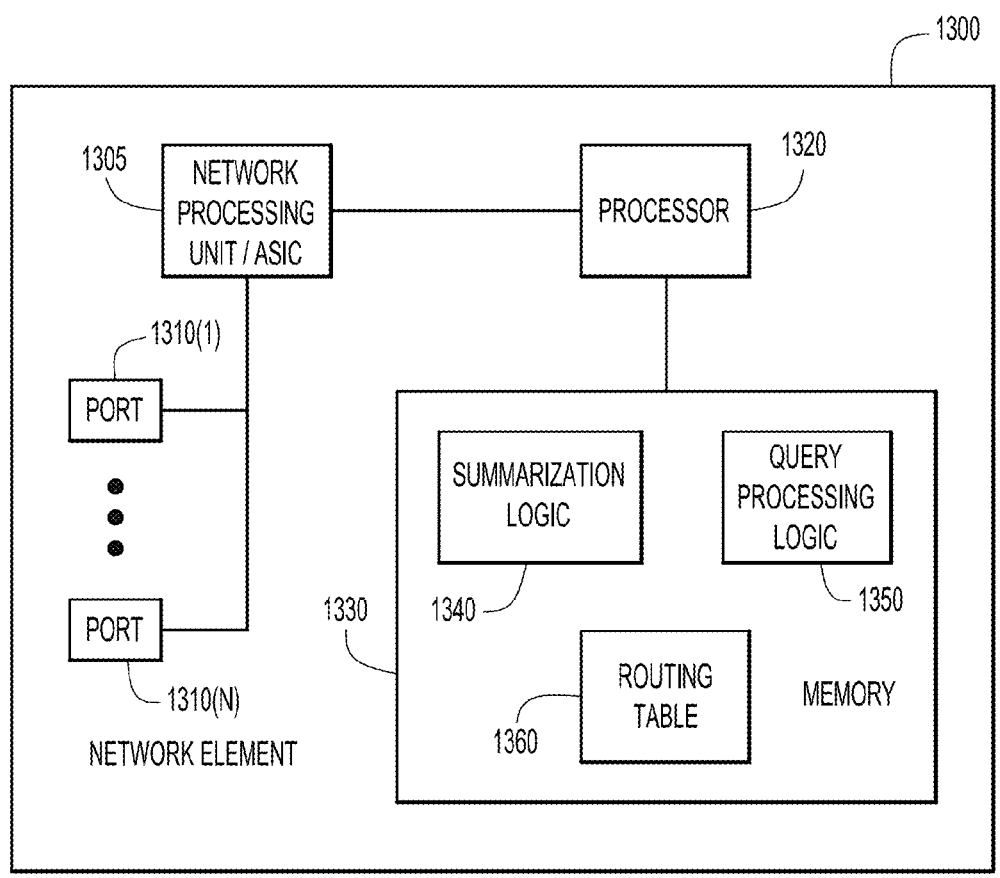
FIG. 17 is an example of a block diagram of a network element configured to perform the summarization and query processing/forwarding operations presented herein, in accordance with certain example embodiments.
Figure 18:
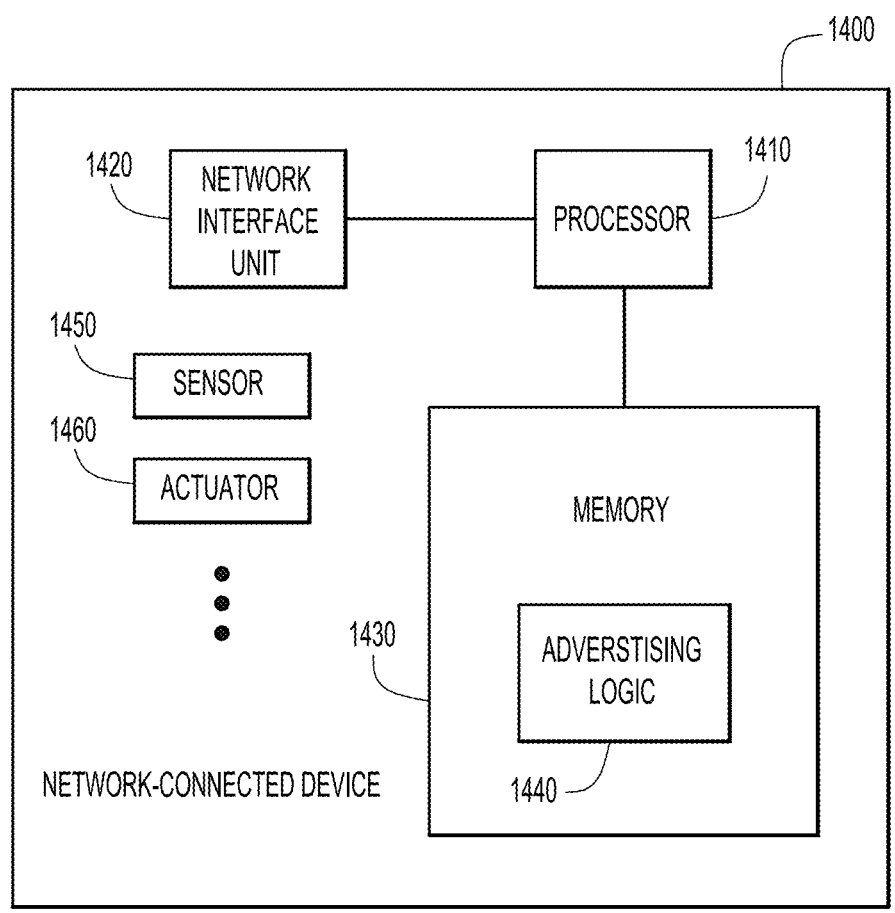
FIG. 18 is an example of a block diagram of a network-connected device configured to support the techniques presented herein, in accordance with certain example embodiments.

Reference is now made to FIGS. 17 and 18, which illustrate example block diagrams of a network element and a network-connected device, respectively, configured to perform the techniques described above. Referring first to FIG. 17, a block diagram of a network element 1300 (e.g., router, switch, etc.) is shown. The network element 1300 includes a network processing unit/application specific integrated circuit (ASIC) 1305, e.g., router processor, switch processor, etc., that is coupled to a plurality of ports 1310(1)-1310(N). The network processing unit 1305 performs the various network processing functions that are typically embodiment in general processor software or in a dedicated hardware ASIC. A processor 1320 is coupled to the network processing unit 1305. The processor 1320 is also coupled to memory 1330. The memory 1330 stores instructions for summarization logic 1340 and instructions for query process logic 1350. In addition, the memory 1330 may store the routing table 1360 that is also referred to herein as the local database. Alternatively, the routing table 1360 may be stored and maintained by the network processing unit 1305.

Memory 1330 may comprise read only memory (ROM), random access memory (RAM), magnetic disk storage media devices, optical storage media devices, flash memory devices, electrical, optical, or other physical/tangible memory storage devices. The processor 1320 is, for example, a microprocessor or microcontroller that executes instructions stored in the memory 1330. Thus, in general, the memory 1330 may comprise one or more tangible (non-transitory) computer readable storage media (e.g., a memory device) encoded with software comprising computer executable instructions and when the software is executed (by the processor 1320) it is operable to perform the summarization and advertising operations described above in connection with FIGS. 1-4, 5A, 5B, 14 and 15 when executing the summarization logic 1340, and likewise is operable to perform the query processing and forwarding operations described above in connection with FIGS. 1, 6-12 and 16 when executing the query process logic 1350.

FIG. 18 illustrates an example block diagram of a network-connected device configured to support the operations described herein. The network-connected device, shown at reference numeral 1400, includes a processor 1410, a network interface unit 1420 and memory 1430. The network interface unit 1420 may support wired and/or wireless network connectivity, e.g., Ethernet and/or Wi-Fi™, 4G, LTE, etc. The memory 1430 stores instructions for advertising logic 1440. In addition, to support any of a variety of network-connected functions, the network-connected device may further include a sensor 1450, actuator 1460 and/or any other component needed to support a particular function. The processor 1410 may take on any of a variety of forms. The memory 1430 may take on any of the forms described above in connection with FIG. 17. The processor 1410 executes the instructions for the advertising logic 1440 to perform the operations described herein, in particular in connection with FIG. 13.

In summary, the techniques presented herein distribute the processing of communication to network-connected devices to routing nodes, as opposed to centralizing those operations in one device as in the traditional/classical system. By using a bitmapped Type field, advertisements and queries can be categorized. Also by using a Subgroup field the scope of advertisements and queries can be dynamically limited. These techniques reduce the number of matches and make the matches more relevant to the user who sent the query. Routing nodes can be any network element that routes traffic, physical or virtual (cloud-based router or switch). The intelligence to perform these techniques can be embodied as an overlay on top of a physical network. These techniques perform the contextual tagging and subgroup overlay functions without the use of brute compute resources. This is achieved at the network level, providing a new dimension to network intelligence that can be leveraged by other resources and provide additional functionality to Internet-of-Things applications. For enterprise infrastructure, type matching can be used to discover information about types of devices (routers, servers, appliances etc.), and their respective capabilities to match requests for resources to resource providers. For consumers, there is a demand to connect users to information based on the specific characteristic taxonomies of information classes, as well as infrastructures to query users based on their specific device types (Smartphone, tablet, operating system type, etc.).

Again, these techniques provide for associating Type and Subgroup fields IPv6 address/subnet (or any other aggregatable routing system) and for ways to manipulate (aggregate) these fields when the IPv6 subnets are aggregated and advertised/propagated through the network. The techniques also provide ways to match a query, and to route/forward a query through the network using the Type and Subgroup fields to obtain desired filtering properties and functions.

In a network element, each routing entry will have a single Type field and a single Subgroup field. Those fields may have been summarized to get to that point. When a network element is analyzing a query against an entry, the network element does not know or care whether the Type field or Subgroup field has been summarized or not. If there is a match, the network element forwards a copy of the query to that neighbor network element that provided it with that matching routing entry. The neighbor network element presumably has more detailed entries and forwards the query on to its neighbors, and so on, until the query gets to a leaf node.

The query entities 30 (FIG. 1) need to know the structure and definitions of the Type and Subgroup fields in order to generate relevant queries. Both the query entities and network-connected devices know and decide a priori what the interpretation is for the Type fields and Subgroup fields. Changes to the Type and Subgroup field structure and definitions could be changed dynamically, as long as both the query entities and network-connected devices know about the changes.

By contrast, the network elements do not need to know anything about the meaning of the Type and Subgroup fields. The network elements just examine bits and performing AND, OR and comparison operations. As a result, the bits in the Type field could mean different things for different Subgroups. For example, for manufacturer X, the Type field bits may mean one type of capability, and for manufacture Y, the Type field bits may mean something different. Same 32 bit Type field, but what each bit means can be different for different Subgroups. Said another way, the bit map representation of capabilities of a network-connected device (IoT) device contained in the Type field is dependent on the binary expression of the number in the Subgroup field such that the Type field may connote different capabilities for different numbers represented in the Subgroup field.

The concepts presented herein may be embodied in an apparatus comprising a plurality of ports configured to receive from and send packets to a network; a network processing unit coupled to the plurality of ports and configured to perform routing or switching operations in the network; and a processor coupled to the network processing unit, wherein the processor is configured to: obtain Type field and Subgroup field information for each of a plurality of network-connected devices to which the apparatus is connected, the Type field being a bit map representation of capabilities of the network-connected device and the Subgroup field being a binary expression of a number representing a subgroup to which the network-connected device is a member; append to each of a plurality of routing entries maintained by the apparatus a tag comprising a Type field and a Subgroup field for each network-connected device so that each routing entry comprises an identifier for the network-connected device, together with the Type field and Subgroup field for the network-connected device; generate summarized information of a plurality of routing entries maintained by the apparatus, the summarized information consolidating the Type field and Subgroup field information for the plurality of routing entries; and advertise the capabilities of the network-connected devices connected to the apparatus by generating a message to be sent to one or more other network elements, the message comprising summarized routing entries and associated summarized Type field and Subgroup field information.

Similarly, an apparatus is provided comprising a plurality of ports configured to receive from and send packets to a network; a network processing unit coupled to the plurality of ports and configured to perform routing or switching operations in the network; and a processor coupled to the network processing unit, wherein the processor is configured to: receive a message including a query intended for one or more network-connected devices, the query containing at least a Type field comprising a bit map representation of one or more capabilities of network-connected devices and/or a Subgroup field comprising a binary expression of a number representing a subgroup to which one or more network-connected devices is a member; analyze the query with respect to stored data comprising one or more routing entries, each routing entry including an identifier, a Type field representing one or more capabilities of network-connected devices and/or a Subgroup field representing a subgroup to which one or more network-connected devices is a member, in order to identify one or more routing entries, if any, in the stored data that match the query; and forward the query to either one or more network-connected devices associated with the apparatus for one or more routing entries determined to match the query and/or to one or more other network elements associated with the one or more identifiers for the one or more routing entries determined to match the query.

The above description is intended by way of example only. Various modifications and structural changes may be made therein without departing from the scope of the concepts described herein and within the scope and range of equivalents of the claims.

What is claimed is:

1. A method comprising:
at a first network element configured to perform routing or switching operations in a network, obtaining Type field and Subgroup field information for each of a plurality of network-connected devices to which the first network element is connected, the Type field being a bit map representation of capabilities of the network-connected device and the Subgroup field being a binary expression of a number representing a subgroup to which the network-connected device is a member, wherein the bit map representation is dependent on the binary expression such that the Type field may connote different capabilities for different numbers represented in the Subgroup field;
appending to each of a plurality of routing entries maintained by the first network element a tag comprising the Type field and the Subgroup field for each network-connected device so that each routing entry comprises an identifier for the network-connected device, together with the Type field and Subgroup field for the network-connected device;
generating summarized information of a plurality of routing entries maintained by the first network element, the summarized information consolidating the Type field and Subgroup field information for the plurality of routing entries; and
advertising capabilities of the network-connected devices connected to the first network element by sending to one or more other network elements a message comprising summarized routing entries and associated summarized Type field and summarized Subgroup field information.

2. The method of claim 1, wherein generating the summarized information comprises performing a logical OR operation on the Type fields for the plurality of routing entries to generate a single summarized Type field and performing a logical OR operation on the Subgroup fields for the plurality of routing entries to generate a single summarized Subgroup field.

3. The method of claim 1, wherein generating the summarized information is performed for routing entries within the same subnet to generate a tag containing the summarized Type field and the summarized Subgroup field for each subnet, and appending comprises appending the tag to a subnet identifier for each corresponding subnet.

4. The method of claim 3, wherein sending comprises sending the message so as to include the subnet identifier and associated tag containing the summarized Type field and the summarized Subgroup field for a corresponding subnet.

5. The method of claim 1, wherein the binary expression contained in the Subgroup field is a number representing a grouping of network-connected devices based on any grouping criteria.

6. The method of claim 1, further comprising storing data containing an entry for each network-connected device associated with the first network element, wherein each entry contains an identifier for the network-connected element together with its Type and Subgroup tag.

7. The method of claim 6, wherein generating summarized information comprises summarizing the entries maintained by the first network element associated with an Internet Protocol (IP) address of the first network element when the network-connected devices do not communicate with the first network element using IP.

8. The method of claim 6, wherein storing comprises storing at the first network element multiple entries associated with a particular network-connected devices if the particular network connected device is a member of multiple subgroups, and wherein generating the summarized information comprises summarizing the multiple entries associated with the particular network-connected device into a single entry before advertising the capabilities of the network-connected devices connected to the first network element.

9. A method comprising:
at a first network element configured to perform routing or switching operations in a network, receiving from a plurality of other network elements messages advertising capabilities of network-connected devices in the network, each message comprising one or more routing entries each including a network identifier and a tag including a Type field and a Subgroup field, the Type field being a bit map representation of capabilities of one or more network-connected devices associated with the network identifier and the Subgroup field being a binary expression of a number representing a subgroup to which each of the one or more network-connected devices is a member, wherein the bit map representation is dependent on the binary expression such that the Type field may connote different capabilities for different numbers represented in the Subgroup field;

generating summarized information from the routing entries contained in the received messages, the summarized information consolidating on the basis of network identifiers the Type field and Subgroup field information for the routing entries; and advertising the capabilities of the network-connected devices associated with the plurality of other network elements by sending to at least a second network element, a message comprising each network identifier and its associated summarized Type field and summarized Subgroup field information.

10. The method of claim 9, wherein generating the summarized information comprises performing a logical OR operation on the Type fields associated with the plurality of routing entries to generate a single summarized Type field and performing a logical OR operation on the Subgroup fields associated with the plurality of routing entries to generate a single summarized Subgroup field.

11. The method of claim 10, wherein generating the summarized information is performed for routing entries within the same subnet.

12. The method of claim 11, wherein sending comprises sending the message so as to include the subnet identifier and associated tag containing the summarized Type field and the summarized Subgroup field for a corresponding subnet.

13. The method of claim 9, wherein receiving comprises receiving from one or more of the plurality of network elements, one or more messages that include a plurality of messages that have been summarized, on the basis of Internet Protocol (IP) address, Type and Subgroup, by the one or more of the plurality of network elements.

14. A method comprising:
at a first network element, receiving a message including a query intended for one or more network-connected devices, the query containing at least a Type field comprising a bit map representation of one or more capabilities of network-connected devices and/or a Subgroup field comprising a binary expression of a number representing a subgroup to which one or more network-connected devices is a member;
analyzing the query with respect to stored data comprising one or more routing entries, each routing entry including an identifier, a Type field representing one or more capabilities of network-connected devices and/or a Subgroup field representing a subgroup to which one or more network-connected devices is a member, in order to identify one or more routing entries, if any, in the stored data that match the query, wherein analyzing comprises performing a logical AND operation between the Type field of the query and the Type field in each routing entry, and determining a match of a routing entry to the query when a result of the AND operation of the Type field of the query and the Type field of the routing entry is non-zero; and
forwarding the query to either one or more network-connected devices associated with the first network element for one or more routing entries determined to match the query and/or to one or more other network elements associated with the one or more identifiers for the one or more routing entries determined to match the query.

15. The method of claim 14, wherein analyzing comprises analyzing the query with respect to the stored data for the one or more routing entries, wherein each routing entry further includes a Subgroup field representing a subgroup of network-connected devices in the subnet associated with the subnet identifier for the routing entry.

16. The method of claim 15, wherein analyzing further comprises, for any routing entries determined to have a Type field that matches the query, performing a logical AND operation between the Subgroup field of the query and the Subgroup field of the routing entry, and determining a match of a routing entry to the query when a result of the AND operation of the Subgroup field of the query and the Subgroup field of the routing entry is equal to the Subgroup field of the query.

17. The method of claim 16, wherein when a next-hop of the matching routing entry is determined to be a network-connected device, analyzing comprises determining whether the Subgroup field of the query is exactly equal to the Subgroup field of the matching routing entry.

18. The method of claim 14, wherein the query further includes a network identifier specifying a subnet to which the query applies, and wherein analyzing comprises analyzing the query with respect to routing entries that are within the subnet of the query.

19. The method of claim 14, wherein forwarding comprises forwarding the query to each next-hop routing entry that is determined to match the query.

20. The method of claim 14, wherein analyzing comprises determining a first routing entry that matches the query and terminating any further analyzing even if there are other routing entries that match the query, and wherein forwarding comprises forwarding the query based on the first routing entry that matches the query.

21. An apparatus comprising:
a plurality of ports configured to receive from and send packets to a network;
a network processing unit coupled to the plurality of ports and configured to perform routing or switching operations in the network; and
a processor coupled to the network processing unit, wherein the processor is configured to:
obtain Type field and Subgroup field information for each of a plurality of network-connected devices to which the apparatus is connected, the Type field being a bit map representation of capabilities of the network-connected device and the Subgroup field being a binary expression of a number representing a subgroup to which the network-connected device is a member, wherein the bit map representation is dependent on the binary expression such that the Type field may connote different capabilities for different numbers represented in the Subgroup field;
append to each of a plurality of routing entries maintained by the apparatus a tag comprising the Type field and the Subgroup field for each network-connected device so that each routing entry comprises an identifier for the network-connected device, together with the Type field and Subgroup field for the network-connected device;
generate summarized information of a plurality of routing entries maintained by the apparatus, the summarized information consolidating the Type field and Subgroup field information for the plurality of routing entries; and advertise the capabilities of the network-connected devices connected to the apparatus by generating a message to be sent to one or more other network elements, the message comprising summarized routing entries and associated summarized Type field and Subgroup field information.

22. The apparatus of claim 21, wherein the processor is configured to generate the summarized information for routing entries within the same subnet to generate a tag containing a summarized Type field and summarized Subgroup field for each subnet, and to append the tag to a subnet identifier for each corresponding subnet.

23. The apparatus of claim 21, wherein the processor is configured to store data containing an entry for each network-connected device associated with the apparatus, wherein each entry contains an identifier for the network-connected element together with its Type and Subgroup tag.

24. The apparatus of claim 23, wherein the processor is configured to generate the summarized information by summarizing the entries maintained by the apparatus associated with an Internet Protocol (IP) address of the apparatus when the network-connected devices do not communicate with the apparatus using IP.

25. An apparatus comprising:
- a plurality of ports configured to receive from and send packets to a network;
- a network processing unit coupled to the plurality of ports and configured to perform routing or switching operations in the network; and
- a processor coupled to the network processing unit, wherein the processor is configured to:
  - receive a message including a query intended for one or more network-connected devices, the query containing at least a Type field comprising a bit map representation of one or more capabilities of network-connected devices and/or a Subgroup field comprising a binary expression of a number representing a subgroup to which one or more network-connected devices is a member;
  - analyze the query with respect to stored data comprising one or more routing entries, each routing entry including an identifier, a Type field representing one or more capabilities of network-connected devices and/or a Subgroup field representing a subgroup to which one or more network-connected devices is a member, in order to identify one or more routing entries, if any, in the stored data that match the query, wherein the processor is configured to analyze by performing a logical AND operation between the Type field of the query and the Type field in each routing entry, and determining a match of a routing entry to the query when a result of the AND operation of the Type field of the query and the Type field of the routing entry is non-zero; and
  - forward the query to either one or more network-connected devices associated with the apparatus for one or more routing entries determined to match the query and/or to one or more other network elements associated with the one or more identifiers for the one or more routing entries determined to match the query.

26. The apparatus of claim 25, wherein the processor is configured to forward the query to each next-hop routing entry that is determined to match the query.

27. The apparatus of claim 25, wherein the processor is configured to analyze by determining a first routing entry that matches the query and to terminate any further analysis even if there are other routing entries that match the query, and to cause the query to be forwarded based on the first routing entry that matches the query.

* * * * *